(12) United States Patent
Holzapfel et al.

(10) Patent No.: US 9,766,098 B2
(45) Date of Patent: Sep. 19, 2017

(54) OPTICAL POSITION MEASURING INSTRUMENT

(75) Inventors: Wolfgang Holzapfel, Obing (DE); Michael Hermann, Tacherting (DE); Karsten Sändig, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 775 days.

(21) Appl. No.: 13/068,659

(22) Filed: May 16, 2011

(65) Prior Publication Data

US 2011/0286004 A1    Nov. 24, 2011

(30) Foreign Application Priority Data

May 21, 2010   (DE) .................. 10 2010 029 211

(51) Int. Cl.
*G01B 11/02* (2006.01)
*G01N 21/41* (2006.01)
*G01B 11/30* (2006.01)
*G01D 5/347* (2006.01)
*G01D 5/38* (2006.01)

(52) U.S. Cl.
CPC ........... *G01D 5/347* (2013.01); *G01D 5/3473* (2013.01); *G01D 5/38* (2013.01)

(58) Field of Classification Search
CPC ... G01D 5/347; G01D 5/3473; G01D 5/34746
USPC .................. 356/488, 494, 499, 521, 515; 250/231.14–231.18
See application file for complete search history.

(56) References Cited

U.S. PATENT DOCUMENTS

| 5,079,418 | A | 1/1992 | Michel et al. |
| 5,327,218 | A * | 7/1994 | Igaki .............................. 356/499 |
| 5,442,172 | A | 8/1995 | Chiang et al. |
| 7,471,397 | B2 | 12/2008 | Holzapfel |
| 7,714,273 | B2 | 5/2010 | Saendig |
| 2005/0007598 | A1* | 1/2005 | Ishizuka ........................ 356/499 |
| 2006/0033020 | A1* | 2/2006 | Huber ..................... 250/231.13 |
| 2007/0013920 | A1 | 1/2007 | Holzapfel |
| 2008/0062432 | A1* | 3/2008 | Sandig et al. ................. 356/499 |

(Continued)

FOREIGN PATENT DOCUMENTS

| DE | 10 2005 029 917 A1 | 1/2007 |
| EP | 0 387 520 A2 | 9/1990 |
| EP | 1 923 673 A2 | 5/2008 |

(Continued)

*Primary Examiner* — Sunghee Y Gray
(74) *Attorney, Agent, or Firm* — Brinks Gilson & Lione

(57) ABSTRACT

An optical position measuring instrument including a scale and a scanning unit, wherein the scanning unit and the scale are movable with respect to one another. The scanning unit includes a detector unit, and a reflector unit that has a first and second wave front correctors and a beam direction inverter. The reflector unit is disposed so that beams first pass through the scale and the first wave front corrector, then a back-reflection of partial beams is effected in a direction of the scale, and the partial beams then pass through the scale and the second wave front corrector before the partial beams then arrive at the detector unit, wherein it is ensured that wave front deformations of the partial beams are converted into wave front deformations that compensate for resultant wave front deformations of the partial beams upon a second diffraction at the scale.

22 Claims, 18 Drawing Sheets

(56) References Cited

U.S. PATENT DOCUMENTS

2008/0117440 A1     5/2008    Saendig

FOREIGN PATENT DOCUMENTS

| JP | 2001-304918 A | 10/2001 |
|---|---|---|
| JP | 2008-70363 A | 3/2008 |

* cited by examiner

OPTICAL POSITION MEASURING INSTRUMENT

RELATED APPLICATIONS

Applicants claim, under 35 U.S.C. §119, the benefit of priority of the filing date of May 21, 2010 of a German patent application, copy attached, Serial Number 10 2010 029 211.7, filed on the aforementioned date, the entire contents of which is incorporated herein by reference.

BACKGROUND

1. Technical Field

The present invention relates to an optical position measuring instrument.

2. Background Information

With regard to optical position measuring instruments for detecting relative motions of the scale and scanning unit along curved measurement directions, a distinction can be made between two fundamental types:

a) Optical position measuring instruments with scales in the form of radial graduations disposed on graduated disks;

b) Optical position measuring instruments with scales in the form of drum graduations disposed on graduation drums.

In the first optical position measuring instruments mentioned, which have a graduated disk with a fine radial graduation as a scale, the mounting tolerances of the scale relative to the scanning unit are usually extremely narrow. This is due to the strong signal dropoff, which results at even small radial, tangential or longitudinal deviations in position of the radial graduation from the desired installation location, because of the attendant wave front deformations in the partial beams involved in the signal generation, which are brought into interfering superposition. The radially varying grating constants of the radial graduation cause major wave front deformations. This means that the wave fronts of the partial beams diffracted by the radial graduation sometimes have considerable deviations from planar wave fronts.

Similar problems arise in optical position measuring instruments of the second category as well, in which the scale is disposed as a so-called drum graduation on the outer circumference of a rotating drum or rotating cylinder. Here, the curved drum graduation again causes a distortion of the wave fronts in the partial beams which are used for signal generation.

Such wave front deformations also already result in the ideal mounting location of the scale and will hereinafter be called nominal wave front deformations. If the mounting location is not ideal, additional tolerance-caused wave front deformations occur. The various wave front deformations that occur in the partial beams used for signal generation are thus definitively responsible for the signal dip mentioned at the outset in the position signals generated. The consequence is markedly poorer signal quality of such optical position measuring instruments.

In high-resolution optical position measuring instruments for detecting linear displacement motions of the scale and the scanning unit, it is known to use retroreflectors in the form of triple prisms; as an example, see European Patent Disclosure EP 387 520 A2. In the scanning beam path proposed therein, a collimated beam from a laser light source is diffracted at the linear grating of the scale into partial beams of a +1st and −1st order of diffraction. Next, the partial beams, by one or more retroreflectors in the form of triple prisms, are redirected toward the linear grating of the scale. After a further diffraction at the scale, the two partial beams are made to interfere with one another at a superposition location. By the use of the one or more retroreflectors embodied as triple prisms, it is ensured that even if the scale is arbitrarily tilted relative to the scanning unit, the two partial beams, after the second diffraction at the linear grating of the scale, maintain their direction. No wave front tilting of the interfering partial beams then occurs. As a result, there is maximum interference contrast in the overlapping range of the interfering partial beams. In this manner, fundamentally wide mounting tolerances are attainable, even with extremely fine graduation periods of the scale and large scanning areas, that is, large beam cross sections at the location of the scale. Basically, however, the good properties of such optical position measuring instruments are based on the condition that the wave fronts of the partial beams remain as planar as possible, both after the diffraction at the linear grating of the scale and after the reflection at the retroreflector. As a result, the wave front tilting caused by tilting of the scale is ideally compensated for by the retroreflectors used.

If high-resolution optical position measuring instruments are now to be used for detecting relative motions of the scale and scanning unit along curved measurement directions, or in other words, if systems with radial grating graduations or drum graduations are used in conjunction with retroreflectors, certain problems arise. In U.S. Pat. No. 5,442,172, the entire contents of which are incorporated herein by reference, these problems are analyzed and supposed solutions to them are proposed. For instance, according to this reference, the influence of wave front deformations that impairs the signal quality is reduced because an ideal reflector unit is proposed. This unit includes a combination of a spherical lens and a roof prism, which is disposed in the focal plane of the lens. However, a more-precise analysis of the proposed scanning optics shows that a significant signal dropoff still occurs if the scale and the scanning unit are incorrectly adjusted. A further factor is that in the proposed ideal retroreflector unit, the beam focus is located at the roof of the roof prism, which must therefore be manufactured absolutely without flaws in that area. In that area, there must be absolutely no nonhomogeneities, such as inclusions, dirt, or stepped edges. Because of the stringent demands made in terms of the production of such a component, this component is thus extremely expensive.

OBJECTS AND SUMMARY OF THE INVENTION

It is an object of the present invention to disclose a high-resolution optical position measuring instrument for detecting the relative position of a scanning unit and a scale, which is movable relative to it in a curved measurement direction, with wide mounting tolerances.

This object is attained according to the present invention by an optical position measuring instrument for detecting a relative position of a scanning unit and a scale. The optical position measuring instrument includes a scale and a scanning unit, wherein the scanning unit and the scale are movable with respect to one another along a curved measurement direction. The scanning unit includes a detector unit, and a reflector unit that has a first wave front corrector, a beam direction inverter and a second wave front corrector. The reflector unit is disposed and/or embodied in the scanning unit so that beams first pass through a first combination of the scale and the first wave front corrector, then via the beam direction inverter, a back-reflection of partial beams is effected in a direction of the scale, and the partial beams then pass through a second combination of the scale and the second wave front corrector before the partial beams then arrive at the detector unit, wherein, via the reflector unit, it is ensured that wave front deformations of the partial beams, which result via a first diffraction at the scale, are converted into wave front deformations that compensate for resultant wave front deformations of the partial beams upon a second diffraction at the scale.

The optical position measuring instrument of the invention includes a scanning unit and a scale, and the scanning unit and the scale are movable with respect to one another along a curved measurement direction. Via the position measuring instrument of the present invention, the relative position of the scanning unit and the scale is detectable. In the scanning unit, at least one reflector unit and one detector unit are provided. The reflector unit includes a first wave front corrector, a beam direction inverter, and a second wave front corrector. The reflector unit is disposed and/or embodied in the scanning unit in such a way that beams first pass through a first combination of the scale and the first wave front corrector, then via the beam direction inverter, a back-reflection of partial beams in the direction of the scale takes place, and the partial beams then pass through a second combination of the scale and the second wave front corrector, before the partial beams then strike the detector unit. Via the reflector unit, it is ensured that the wave front deformations of the partial beams, which deformations result via the first diffraction at the scale, are converted into wave front deformations which compensate for the resultant wave front deformations of the partial beams upon the second diffraction at the scale.

Advantageously, via the first wave front corrector, a conversion of the wave fronts, exiting from the first combination of the scale and the first wave front corrector, into collimated partial beams with planar wave fronts is affected. Via the second wave front corrector, a conversion of the wave fronts, exiting from the second combination of the scale and the second wave front corrector, into collimated partial beams with planar wave fronts is effected, so that the wave fronts of the partial beams that come to be superimposed are, after the second diffraction at the scale, identical at the superposition location.

It can be provided here that the first combination of the scale and the first wave front corrector is disposed in the order of scale—first wave front corrector in the direction of beam propagation; and the second combination of the scale and the second wave front corrector is disposed in the order of second wave front corrector—scale in the beam propagation direction.

Alternatively, it can be provided that the first combination of the scale and the first wave front corrector is disposed in the order of first wave front corrector—scale in the beam propagation direction; and the second combination of the scale and the second wave front corrector is disposed in the order of scale—second wave front corrector in the beam propagation direction.

Preferably, the beam direction inverter is embodied such that a beam direction inversion relative to the partial beams reflected from it takes place in two orthogonal directions.

In one possible embodiment, the beam direction inverter can be embodied as a triple mirror or as a triple prism.

Furthermore, the beam direction inverter can include a combination of a lens and a reflector mirror.

It is possible that the wave front correctors or lens of the beam direction inverter, or both, are embodied as refractive optical elements.

The wave front correctors can be embodied as diffractive optical elements.

It is furthermore possible that the wave front correctors and the lens of the beam direction inverter are embodied as a diffractive optical element.

Moreover, it can be provided that
the wave front correctors are each embodied as diffractive combination elements in the form of scanning gratings, which moreover have at least one of the following additional optical functionalities on the partial beams striking them:
an optical deflection effect;
an optical splitting or uniting effect;
an optical focusing effect on the reflector mirror.

The reflector mirror and the diffractive optical elements can be disposed on opposite sides of a transparent scanning plate.

In a further embodiment, the scale is embodied as a radial graduation on a graduated disk and is disposed concentrically around the axis of rotation.

Alternatively, it can be provided that the scale is embodied as a drum graduation on the outer circumference of a rotating graduation drum, and the axis of rotation coincides with the longitudinal axis of the graduation drum.

It is advantageous here if the optical elements are embodied and disposed in a scanning unit such that the beam emitted by the light source strikes the drum graduation at an angle not equal to 90°.

The scanning optics element of the optical position measuring instrument of the present invention is based on the special embodiment of the reflector unit. This unit ensures that the partial beams diffracted by the scale are back-reflected onto the scale again in such a way that they then have identical wave fronts upon superposition. A maximal interference contrast in the interferential signal generation is thus ensured. This is ensured both for the ideal mounting location of the scale and for narrow tolerance-dictated deviations from it. Via the scanning optics of the position measuring instrument of the present invention, both the nominal wave front deformations and the tolerance-dictated wave front deformations are therefore reliably corrected. A signal dip in the event of a possibly non-optimal relative calibration of the scale and scanning unit can thus be avoided; that is, the desired high mounting tolerance is ensured.

Moreover, by way of the provisions according to the present invention, the construction of the scanning optics can be simplified considerably; that is, they can also be produced at less expense.

It should also be mentioned that in position measuring instruments of the prior art, the wave front deformations increase as the graduation periods decrease. For that reason, at predetermined mounting and operating tolerances as well as appropriate scanning field variables, the graduation period of the scale and thus the resolution of the position measuring instrument were limited. By way of the provisions of the present invention, it is now possible to use even smaller graduation periods for the scale; that is, the resolution can be increased considerably.

Further advantages and details of the present invention will become apparent from the ensuing description of exemplary embodiments in conjunction with the accompanying drawings.

DETAILED DESCRIPTION OF THE PREFERRED EMBODIMENTS

Before various exemplary embodiments of the optical position measuring instrument of the present invention are described in detail, the problems regarding the wave front deformations that occur upon retroreflection in the partial beams used for obtaining signals will first be explained in conjunction with FIGS. 1a-1c. In conjunction with FIGS. 1d and 1e, the principle by which the present invention solves these problems will be described.

Figure 1A:
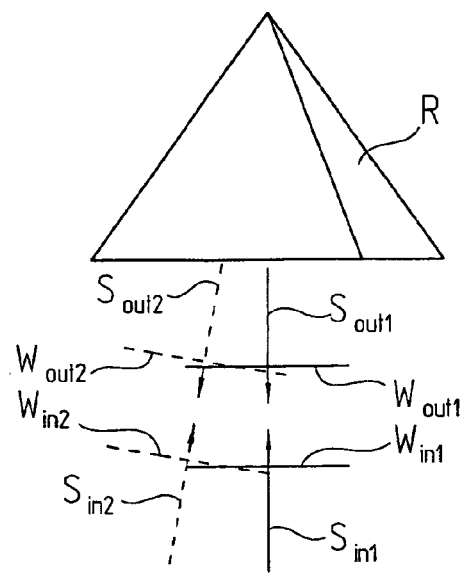
FIGS. 1a through 1e each show a different view to explain the wave front deformations, occurring upon a retroreflection, in the partial beams used for obtaining signals in accordance with the present invention.
Figure 1B:
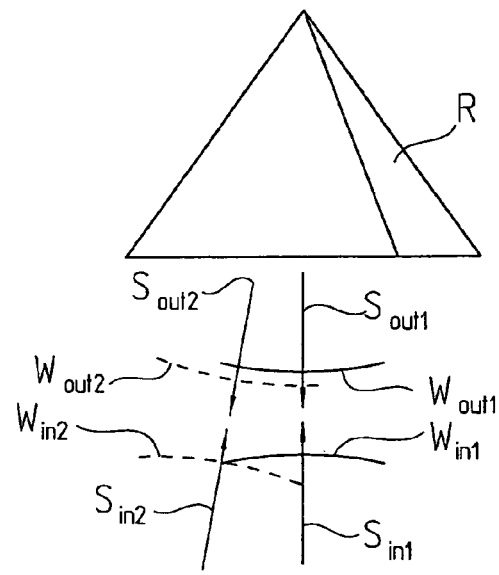

FIG. 1a schematically illustrates the ideal case, in which the two collimated partial beams $S_{in1}$ and $S_{in2}$, involved in obtaining signals, which are propagated in the direction of a reflector unit R embodied as a triple prism, each have a planar wave front $W_{in1}$, $W_{in2}$. By the reflector unit R, these partial beams $S_{in1}$, $S_{in2}$ are inverted with regard to their propagation directions and their wave fronts, and they then travel as partial beams $S_{out1}$, $S_{out2}$, again with planar wave fronts $W_{out1}$, $W_{out2}$, antiparallel back to the direction of incidence.

As explained at the outset, with the optical position measuring instruments of interest here and because of the curved scales in the form of radial grating graduations or drum graduations used for obtaining signals, and because of a possible incorrect mounting of the scale, deformed, non-planar wave fronts $W_{in1}$, $W_{in2}$ are present in both partial beams $S_{in1}$, $S_{in2}$ involved in obtaining the signals. This situation is illustrated in FIG. 1b. Upon the retroreflection via the reflector unit, the non-planar wave fronts are now no longer inverted, as can be seen from FIG. 1b. That is, a convex (concave) wave front viewed in the propagation direction remains a convex (concave) wave front after the retroreflection. Thus considerable deformations remain in the wave fronts $W_{out1}$, $W_{out2}$ of the exiting partial beams $S_{out1}$, $S_{out2}$. In the ensuing superposition—not shown—of these partial beams $S_{out1}$, $S_{out2}$, only a very slight interference contrast therefore results. The unwanted consequence is only a very slight signal intensity in the position signals is generated.

Figure 1C:
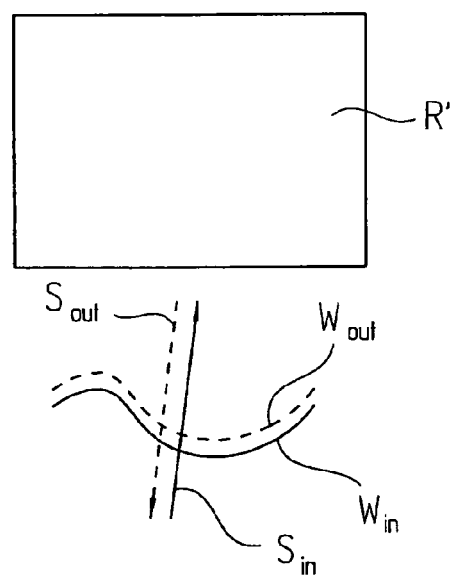

Conversely, what would be desirable would be a reflector unit R' which has an optical effect on one or more incident partial beams $S_{in}$, as is shown in FIG. 1c. Accordingly, the reflector unit R' should invert any arbitrarily deformed wave front $W_{in}$ of an incident partial beam $S_{in}$. In particular, the beam direction of the incident partial beam $S_{in}$ should be inverted, without changing the beam location, so that the incident partial beam runs back into itself after the retroreflection, as can be seen.

Such ideal reflector units are known as phase-conjugated elements and are attainable only by nonlinear opticals, but because of other disadvantages that is not practicable in an optical position measuring instrument.

Figure 1D:
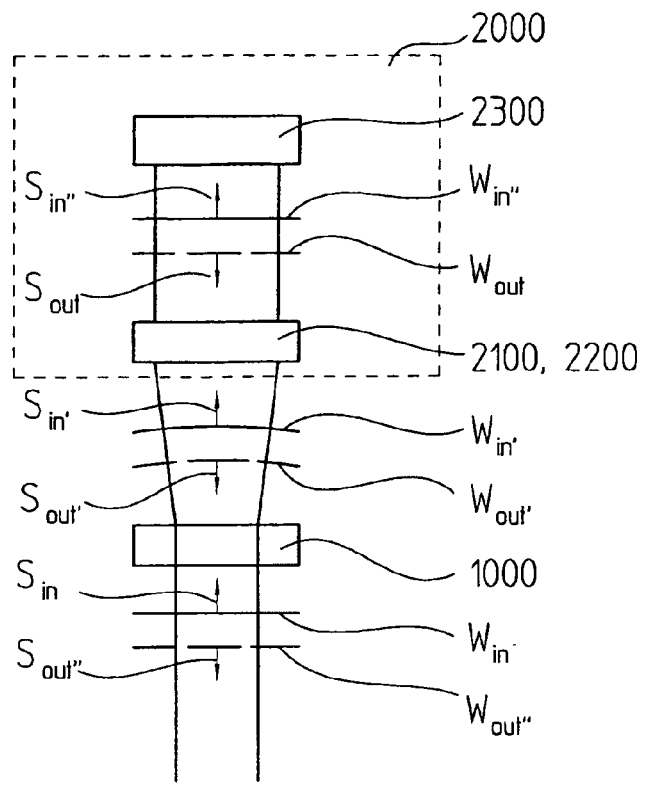
Figure 1E:
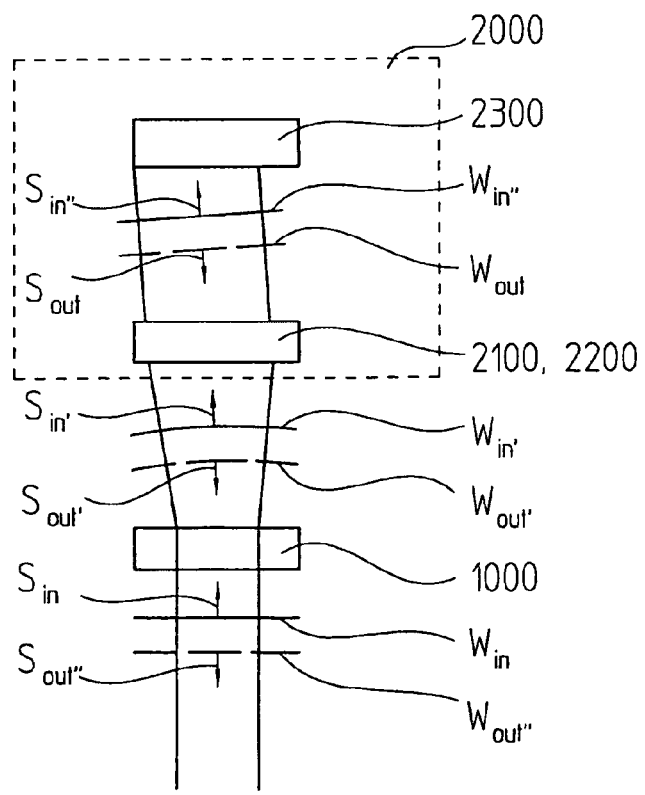

In the present invention, a solution to these problems is therefore contemplated of the kind indicated highly schematically in FIGS. 1d and 1e. FIG. 1d shows the optical effect of a reflector unit 2000, embodied according to the present invention, on a partial beam $S_{in}$, arriving from the scale 1000 (radial graduation or drum graduation), or of its wave front $W_{in}$, for the case of an ideal mounting of the scale 1000. In FIG. 1e, the corresponding relationships are shown for the case of a nonideally mounted scale 1000.

In FIG. 1d, the wave front $W_{in}$ of the incident partial beam $S_{in}$, at the scale 1000 embodied in curved form as a radial graduation or drum graduation, experiences a distortion of the originally planar wave front $W_{in}$ into a deformed or curved wave front $W_{in}'$ upon the first diffraction. The corresponding partial beam $S_{in}'$ is then propagated in the direction of the reflector unit 2000 embodied according to the invention, which in principle includes a first wave front corrector 2100, a beam direction inverter 2300, and a second wave front corrector 2200. In FIG. 1d, the two wave front correctors 2100, 2200 are shown for the sake of simplicity as a single optical component; in the concrete realization of an optical position measuring instrument of the present invention, typically two separate components are provided for the purpose.

Via the first wave front corrector 2100, a conversion first takes place of the partial beam $S_{in}'$ incident there, having the deformed wave front $W_{in}'$, into a partial beam $S_{in}''$ with a planar wave front $W_{in}'$. The partial beam $S_{in}''$ then arrives at the beam direction inverter 2300, which retroreflects the partial beam $S_{in}''$ incident there as an exiting partial beams $S_{out}$ with a planar wave front $W_{out}$, or in other words reflects it back in the direction of incidence. Next, this partial beam $S_{out}$ passes through the second wave front corrector 2200, which converts the incident partial beam $S_{out}$ with the planar wave front $W_{out}$ into a partial beam $S_{out}'$ with a wave front $W_{out}'$ deformed in a defined way. The resultant wave front deformation via the second wave front corrector 2200 takes place such that it compensates for the wave front deformation occurring after the ensuing second diffraction at the scale 1000. After the second diffraction at the scale 2000, a partial beam $S_{out}''$ thus is propagated onward with a planar wave front $W_{out}''$. Analogously, the reflector unit 2000 acts on a further partial beam—not shown—so that after the second diffraction at the scale 1000, finally two partial beams with planar wave fronts can be brought to interfering superposition.

In FIG. 1e, the analogous mechanism of the action of the reflector unit 2000 is illustrated for the case where the scale 1000 is not ideally mounted, so that in addition to the nominal wave front deformations, tolerance-dictated wave front deformations are additionally present in the partial beams used for the signal generation. This additional wave front deformation is indicated in FIG. 1e by the tilted wave front $W_{in}'$ of the partial beam $S_{in}'$ after the first diffraction at the scale 1000. On passing through the first wave front corrector 2100, the deformed wave front $W_{in}'$ of the partial beam $S_{in}'$ is converted into a planar wave front $W_{in}''$, whereupon the partial beam $S_{in}''$ is retroreflected by the beam direction inverter 2300. The retroreflected partial beam $S_{out}$ with the wave front $W_{out}$ thereupon arrives at the second wave front corrector 2200. This wave front corrector transforms the incident wave front $W_{out}$ of the partial beam $S_{out}$ again then in a defined way, so that a partial beam $S_{out}'$ with the correspondingly deformed wave front $W_{out}'$ is propagated onward in the direction of the scale 100. Because of the defined wave front distortion via the second wave front corrector 2200, the result after the second diffraction at the scale 1000 is finally the exiting partial beam $S_{out}''$ with a planar wave front $W_{out}''$, which in turn can be brought to interfering superposition with a further partial beam—not shown.

The reflector unit 2000 shown in FIG. 1e provides planar wave fronts of the exiting partial beam $S_{out}''$ only whenever the tolerance-dictated wave front deformation occurs only as tilting of the wave front, and not as an additional curvature of the wave front. It is in this aspect that the reflector unit 2000 of FIG. 1e differs from the reflector unit R' of FIG. 1c. In practice, however, the predominant proportion of the tolerance-dictated wave front deformation is tilting of the wave front, so that the reflector unit 2000 embodied according to the invention and shown in FIG. 1e illustrates the optical effect that in the final analysis is wanted.

Based on the principles and considerations explained above, several concrete exemplary embodiments of the optical position measuring instrument of the present invention will now be described below.

First Exemplary Embodiment

A first exemplary embodiment of the optical position measuring instrument of the present invention will now be explained in conjunction with FIGS. 2 through 5.

Figure 2:
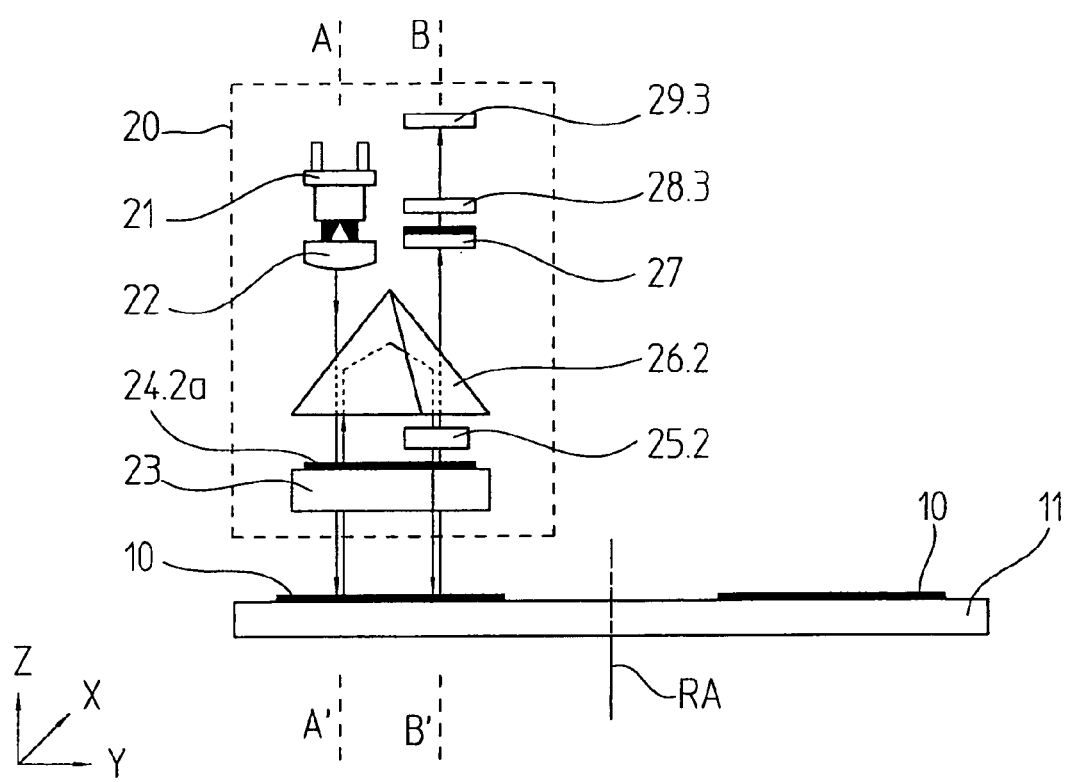
FIGS. 2, 3a, 3b each show part of a possible scanning beam path of a first embodiment of the optical position measuring instrument of the present invention, in different views.
Figure 3A:
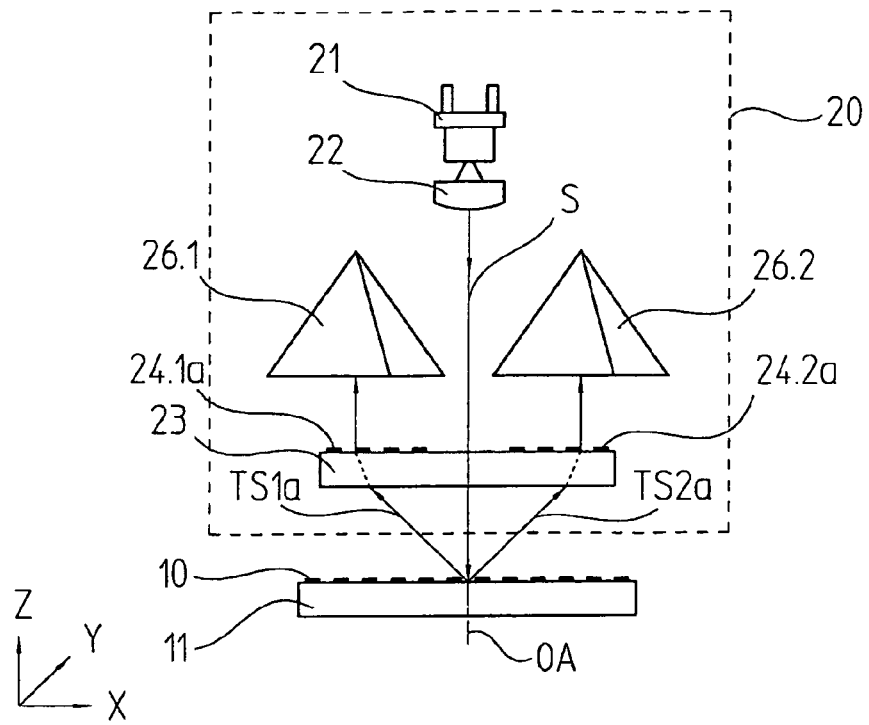
Figure 3B:
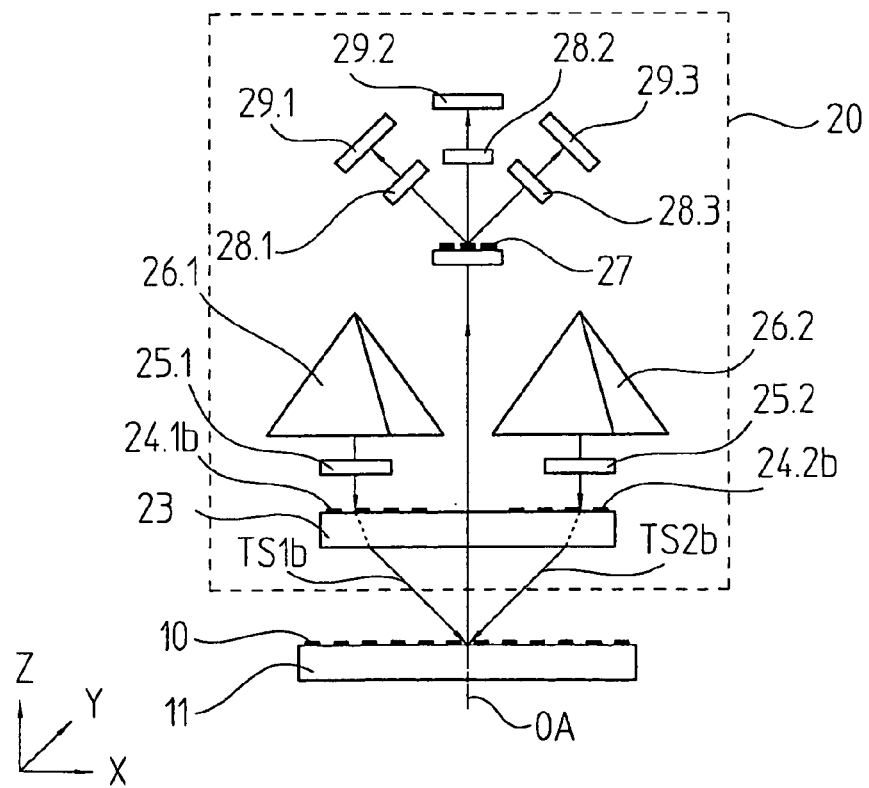

The fundamental scanning beam path of this exemplary embodiment will first be described with the aid of FIGS. 2, 3a and 3b. FIG. 2 shows a radial view of the corresponding optical position measuring instrument in the Y-Z plane; the (curved) measurement direction X is oriented perpendicular to that plane. FIGS. 3a and 3b show tangential sectional views of the optical position measuring instrument along the section lines AA' and BB' indicated in FIG. 2.

The optical position measuring instrument shown includes a scanning unit 20 and a scale 10 movable relative to it along the curved measurement direction X. The scale 10 in this case is embodied as a radial graduation, which is disposed on a graduated disk 11. The graduated disk rotates about the axis of rotation RA, about which the scale 10 or in other words the radial graduation is concentrically disposed.

From the optical scanning of the scale 10, highly precise position signals with regard to the rotational motion of the scanning unit 20 and the scale 10 are generated. The scanning unit 20 and the scale 10 are connected here for instance to machine parts—not shown—that rotate with respect to one another about the axis of rotation RA. The position signals generated with the aid of the apparatus according to the present invention are delivered to a downstream electronic unit—also not shown—which moreover for instance controls the positioning of the corresponding machine parts.

The scale 10 is embodied in a known manner as a reflection graduation, which has sector-shaped, elongated graduation structures with alternating reflection properties disposed periodically and radially to the axis of rotation RA. Typical graduation periods of suitable scales 10 are approximately 1 to 4 µm.

The scanning unit 20, disposed in stationary fashion in the present example, includes a series of optical elements, whose individual functions will be explained in the ensuing description of the scanning beam path for generating the displacement-dependent position signals.

A linearly polarized beam S, emitted by a light source 21, is first collimated via a collimating optical unit 22 and arrives at the scale 10, or radial graduation, on the graduated disk 11 that is movable about the axis of rotation RA. As the light source, a laser diode can for instance be used that emits radiation at the wavelength $\lambda$=780 nm.

It should be pointed out that in the optical position measuring instrument of the present invention, the light source 21 need not necessarily be disposed directly in the scanning unit; alternatively to the variant shown, it could also be provided that the light source is disposed externally and that its emitted radiation be delivered to the scanning unit via suitable optical waveguides.

By the diffraction of +1st and −1st orders of diffraction, resulting at the scale 10, two partial beams TS1a, TS2a are generated, which are back-reflected in the direction of the scanning unit 20. These partial beams TS1a, TS2a have both nominal wave front deformations and wave front deformations because of the embodiment of the scale 10 along a curved line. The nominal wave front deformations and the wave front deformations may be tolerance-dictated, resulting from nonideal mounting of the scale 10.

In the scanning unit 20, the partial beams TS1a, TS2a reach first wave front correctors 24.1a, 24.2a, which are disposed on one side of a scanning plate 23 as shown in FIG. 3a. Via the first wave front correctors 24.1a, 24.2a, the deformed wave fronts of the partial beams TS1a, TS2a are corrected. Next, collimated partial beams TS1a, TS2a with planar wave fronts are propagated onward in the direction of the beam direction inverters 26.1, 26.2. The beam direction inverters 26.1, 26.2 are embodied in the present example as triple prisms, which reflect the incident partial beams TS1a, TS2a back in the direction of the scale 10 as exiting partial beams TS1b, TS2b as shown in FIG. 3b. Here, the partial beams TS1b, TS2b are offset in the radial direction, that is, in the Y direction indicated, as can be seen for instance from FIG. 2. After that, the two partial beams TS1b, TS2b pass through λ/4 plates 25.1, 25.2, by way of which the two originally linearly polarized partial beams TS1b, TS2b are converted into right- and left-circularly polarized partial beams TS1b, TS2b. Next, the partial beams TS1b, TS2b arrive at the second wave front correctors 24.1b, 24.2b. These correctors distort the wave fronts of the two partial beams TS1b, TS2b in such a way that after the second diffraction at the scale 10, both partial beams TS1b, TS2b are again collimated and are superimposed co-linearly at the superposition location.

Next, the detection of phase-offset position signals from the pair of superimposed partial beams TS1b, TS2b takes place. For that purpose, the two partial beams TS1b, TS2b, after the second diffraction at the scale 10, are propagated co-linearly in the direction of the scanning unit 20, where they strike a splitter grating 27 as shown in FIGS. 2 and 3b. The splitter grating 27 splits the two incident, superimposed partial beams TS1b, TS2b into three further pairs of partial beams, which propagate in the direction of a detector unit and reach polarizers 28.1-28.3, which are disposed in different directions in space and have different polarization directions. Via detector elements 29.1-29.3, disposed downstream of the polarizers 28.1-28.3, the detection of the phase-offset position signals finally takes place; in the present example, the result is three position signals phase-offset by 120°. In this exemplary embodiment, the detector unit, besides the detector elements 29.1-29.3, accordingly also includes the polarizers 28.1-28.3 and the splitter grating 27.

In accordance with the above description of the scanning beam path, according to the present invention reflector units are used, which each include first and second wave front correctors 24.1a, 24.1b, 24.2a, 24.2b, and a beam direction inverter 26.1, 26.2 disposed between them. The reflector unit or its corresponding components exert defined optical effects on the incident partial beams TS1a, TS2a and TS1b, TS2b, respectively, which have the distorted wave fronts. Via the corresponding optical effects, it is ensured that by the existing wave front deformations in the partial beams TS1a, TS2a and TS1b, TS2b, used for obtaining signals, no worsening of the signal quality occurs.

Thus, via the first wave front correctors 24.1a, 24.2a, a conversion of the deformed wave fronts of the partial beams TS1a, TS2a striking them, are converted into collimated partial beams with planar wave fronts; via the second wave front correctors 24.1b, 24.2b, a distortion of the planar wave fronts of the partial beams TS1b, TS2b striking them takes place, in such a way that the wave fronts of the partial beams TS1b, TS2b arriving at the superposition are, after the second diffraction at the scale 10, identical at the superposition site.

The beam direction inverters 26.1, 26.2 used are also embodied in the present example in such a way that a beam direction inversion in the radial and tangential directions occurs relative to the partial beams TS1a, TS2a reflected thereby, or in other words a conversion into the indicated Y and X directions, which are oriented orthogonally to one another.

Accordingly, by way of this kind of embodiment of the reflector unit, it is ensured that any possible wave front deformation in the partial beams TS1a, TS2a that results from the first diffraction at the scale 10 is converted into a wave front deformation in the partial beams TS1b, TS2b that compensates for the wave front deformation caused by the second diffraction at the scale 10.

As the beam direction inverters 26.1, 26.2 with retroreflective optical effect, triple prisms are provided in the reflector units of the present exemplary embodiment. As an alternative, the use of triple mirrors at this point, for instance, would also be possible.

The wave front correctors 24.1a, 24.1b, 24.2a, 24.2b are embodied in the first exemplary embodiment shown as diffractive optical elements in the form of scanning gratings. Further details on this will be provided in conjunction with FIG. 4, which shows a top view on a scanning plate 23, with the four wave front correctors 24.1a, 24.1b, 24.2a, 24.2b disposed thereon.

In a good approximation, it is possible to embody the wave front correctors 24.1a, 24.1b, 24.2a, 24.2b as radial scanning gratings with the same graduation period as the radial scale 10 on the graduated disk 11. The wave front correctors 24.1a, 24.1b embodied as radial scanning gratings are disposed on the scanning plate 23 opposite the scale 10, embodied as a radial graduation, on the graduated disk 11, offset parallel by the offset spacing ΔX=XL. The offset spacing ΔX here indicates the spacing, determined in the measurement direction X, of a grating line, located in the middle of the beam, of the scale 10 to a grating line, parallel to it, of the wave front corrector 24.1a, 24.1b. Conversely, the wave front correctors 24.2a, 24.2b are disposed offset by the offset spacing ΔX=+XL. The requisite offset spacing |ΔX|=$X_L$ is determined by the beam deflection of the radial grating on the graduated disk 11 at the mean scanning radius $R_A$ at the level of the scanning plate 23, in accordance with the following Equation 1:

$$X_L = \frac{D}{\sqrt{\left(\frac{2\pi R_A}{N\lambda}\right)^2 - 1}} \quad \text{(Equation 1)}$$

in which

D=effective scanning spacing between the scale and the wave front correctors $R_A$=mean scanning radius λ=wavelength of the light source N=number of grating lines of the scale on the graduated disk.

The diffractive optical elements on the scanning plate 23, or the corresponding radial scanning gratings, by way of which the wave front correctors 24.1a, 24.1b, 24.2a, 24.2b are embodied, are preferably embodied as phase structures. In a simple variant, for instance, phase structures with a phase depth of 180° and a local bar width that is equal to the local gap width are provided. Alternatively, blazed phase structures could also be used. By way of them, it is also possible to suppress orders of diffraction that are not needed, thus making a further increase in the signal intensities in the position signals generated feasible.

Besides the optical functionality discussed thus far, the wave front correctors 24.1a, 24.1b, 24.2a, 24.2b of the present exemplary embodiment have a further optical effect. For instance, they also have a mean optical deflection effect, such that the partial beams TS1a, TS2a and TS1b, TS2b striking them are deflected parallel to the optical axis OA. With respect to the wave front correctors, diffractive optical combination elements in the form of scanning gratings will therefore also be discussed below.

Figure 4:
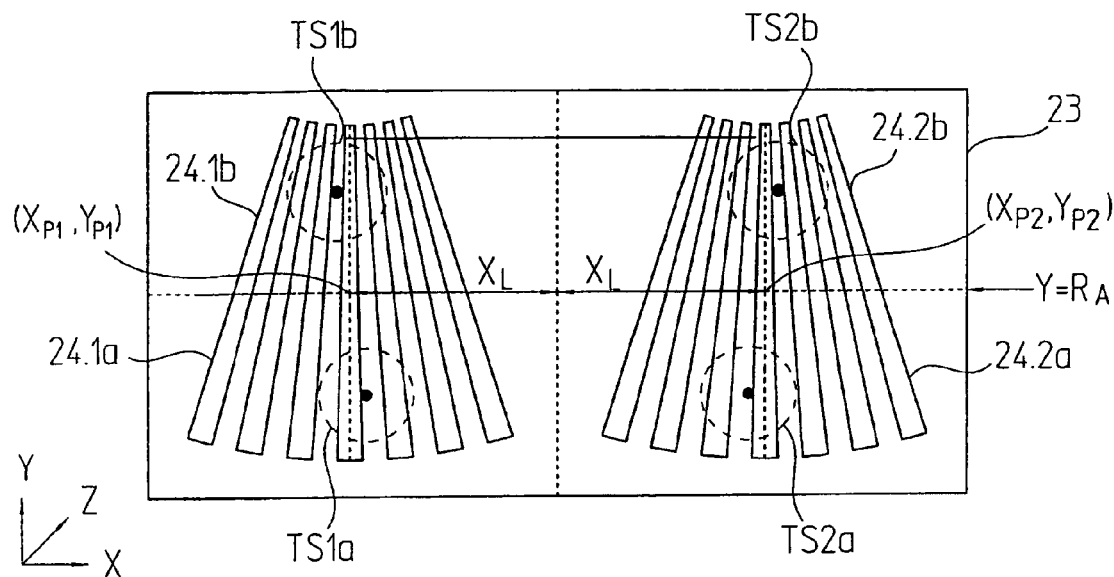
FIG. 4 is a top view on embodiments of wave front correctors of the first embodiment of the optical position measuring instrument of the present invention.
Figure 5:
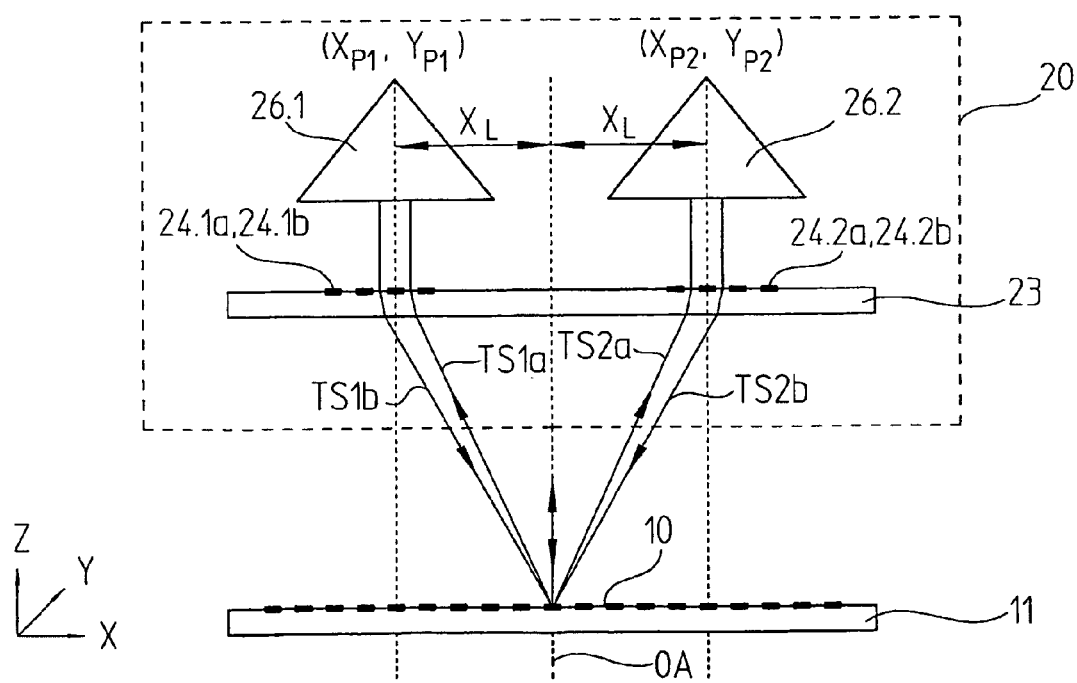
FIG. 5 shows a further view of the scanning beam path of FIGS. 2, 3a, 3b of the first embodiment of the optical position measuring instrument of the present invention.

As can be seen from FIG. 4 and the view in FIG. 5, the partial beams TS1a and TS2a at the level of the scanning plate 23 are each slightly offset inward in the X direction relative to the partial beams TS1b and TS2b, respectively. This offset ensures that at the radially different local grating constants and thus different deflection angles, the partial beams TS1b and TS2b meet one another at the same location, that is, the superposition location, on the scale 10 and are thus superimposed without a beam offset. The correspondingly optimized location $(X_{P1}, Y_{P1})$ and $(X_{P2}, Y_{P2})$, respectively, of the beam direction inverters 26.1, 26.2, or of the triple prisms provided in this example, is found in accordance with the ensuing Equations 2.1-2.3, wherein Y is a direction orthogonal to the X direction:

$$X_{P1} = -XL \quad \text{(Equation 2.1)}$$

$$X_{P2} = +XL \quad \text{(Equation 2.2)}$$

$$Y_{P1} = Y_{P2} = R_A \quad \text{(Equation 2.3)}$$

Equations 2.1-2.3 apply to a coordinate system whose center is located in the middle of the graduated disk 11, whose X axis matches the measurement direction X, and whose Z axis is oriented orthogonally to the scale 10. This coordinate system will also be used in the course of the ensuing description.

Thus, the apexes of the beam direction inverters 26.1, 26.2 embodied as triple prisms are located symmetrically in the X-Y plane of FIG. 4 between the locations where the partial beams TS1a and TS1b, and TS2a and TS2b, strike the wave front correctors 24.1a, 24.1b, 24.2a, 24.2b.

The wave fronts of the beams TS1a and TS2a at the location of the first wave front correctors 24.1a, 24.2a can be determined in a known manner numerically via so-called beam/ray tracing methods or via wave propagation. If the grating phase of the wave front correctors 24.1a and 24.2a are made equivalent to these wave fronts, then even more-ideal diffractive structures can be calculated. The result is slightly distorted and in turn offset radial scanning grating structures. Such optimized wave front correctors 24.1a and 24.2a, in the rated installed position, generate ideally planar wave fronts in the partial beams involved in obtaining the signals.

The second wave front correctors 24.1b and 24.2b can also be optimized in an analogous way. To that end, by reverse propagation of ideally collimated partial beams originating at the detector unit, via the scale 10 or radial graduation of the graduated disk 11, the wave fronts are calculated back to the wave front correctors 24.1b and 24.2b, respectively, and in turn the grating phases of the wave front correctors 24.1b and 24.2b are made equivalent to these wave fronts. The calculation methods used are known from the relevant literature regarding diffractive optical elements. The precise calculations in turn produce slightly distorted and offset radial scanning grating structures.

Since the beam direction inverters 26.1, 26.2, or the triple prisms provided for them, convert planar wave fronts back into planar wave fronts, the wave front correction is not interfered by them. On passing through the wave front corrector 24.1b and 24.2b, respectively, the wave front is therefore predistorted in such a way that after the second diffraction at the scale 10, a planar wave front results for both of the partial beams TS1b, TS2b.

Via the reflector unit embodied according to the present invention, one complete wave front corrector in the rated installed position of all the components of the position measuring instrument (nominal wave front corrector) can thus be ensured, thus along with maximal interference contrast and maximal signal intensity of the position signals generated. Compared to the wave front corrector with spherical lenses and a roof prism, known from the prior art, this represents a marked improvement.

An important further requirement of the reflector unit is that by way of it, the wave fronts themselves should then be correctable, if the scale 10 or the graduated disk becomes shifted or tilted slightly out of the rated installed position. Above all, the radial and tangential displacement of the scale 10 is especially critical for the resultant signal quality. Within the scope of the present invention, it is understood that particularly by the selection of a suitable beam direction inverter 26.1, 26.2 in the reflector unit, wave front deformations caused in that way can be corrected. Thus as an ideal beam direction inverter, a retroreflector element is suitable, such as the triple prism provided in the present first exemplary embodiment. This prism converts the beam inclinations of the incident partial beams, which inclinations are determined by the wave front gradients, into identical beam inclinations of the exiting partial beams. In this way, the additional wave front deformations occurring from slight mounting errors in the two interfering partial beams are corrected (tolerance-dictated wave front corrector). The markedly increased interference contrast leads to an only slight tolerance-dictated drop in signal intensity in the position signals, or conversely to high mounting tolerances. Especially the radial and tangential mounting tolerance is increased considerably in this way, compared to the provisions known from the prior art. Besides the triple prisms provided in the first exemplary embodiment, an alternative embodiment of the beam direction inverters 26.1, 26.2 can also be provided, as will be explained further in terms of the ensuing examples.

Second Exemplary Embodiment

Figure 6:
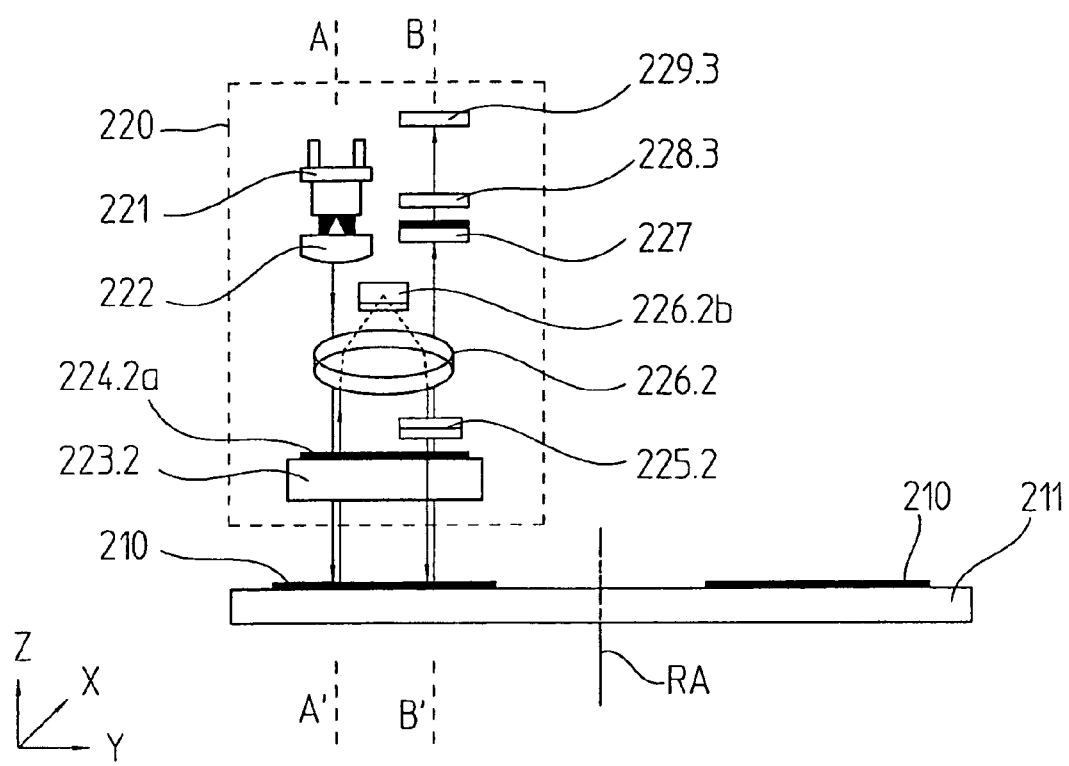
FIGS. 6, 7a, 7b each show part of a possible scanning beam path of a second embodiment of the optical position measuring instrument of the present invention, in different views in accordance with the present invention.
Figure 7A:
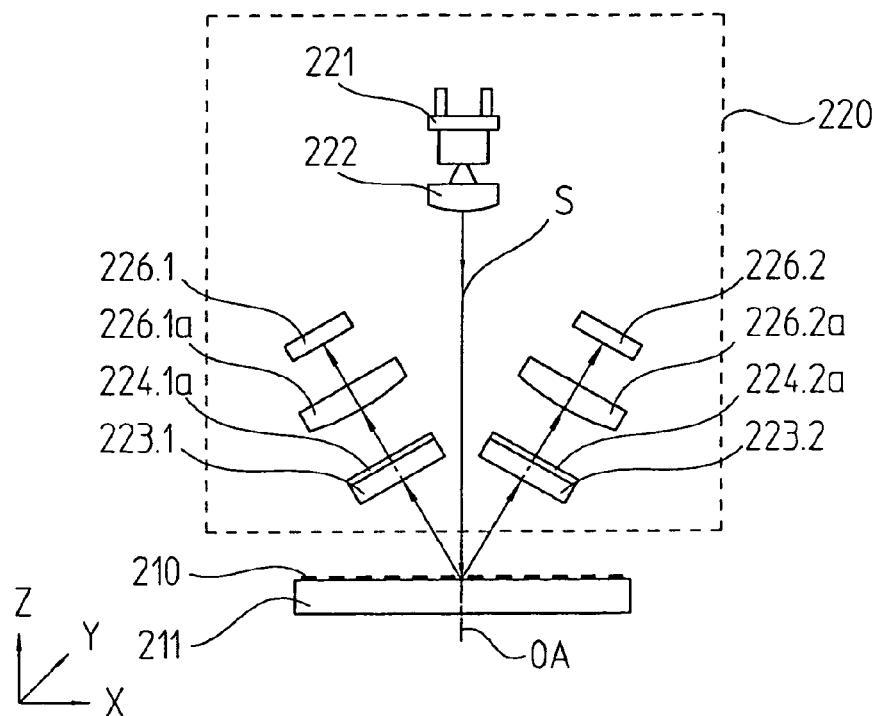
Figure 7B:
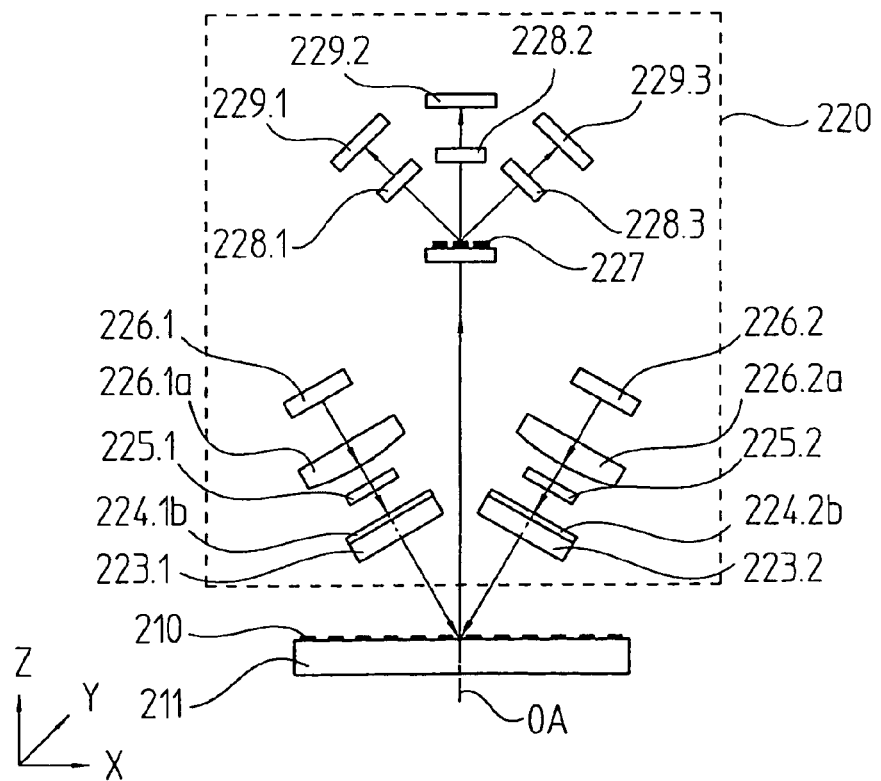
Figure 8:
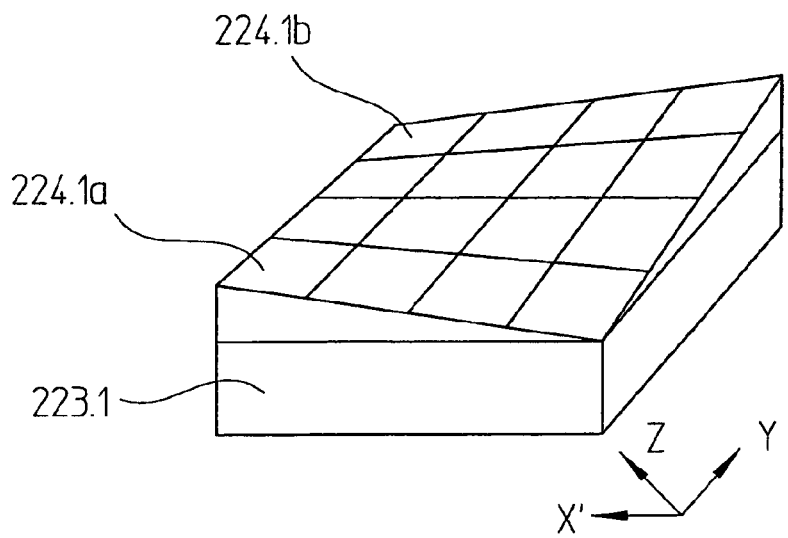
FIG. 8 is a schematic view of embodiments of wave front correctors of the second embodiment of the optical position measuring instrument in accordance with the present invention.

The scanning beam path of a second exemplary embodiment of the optical position measuring instrument of the invention is schematically shown in FIGS. 6, 7a and 7b; these drawings correspond to the illustrations of the scanning beam path in the first exemplary embodiment. In FIG. 8, a wave front corrector is shown for the second embodiment of the optical position measuring instrument of the present invention. Below, only the definitive differences from the first example that has already been explained in detail will be discussed.

Thus it is provided on the one hand that the beam direction inverters, embodied as triple prisms in the first exemplary embodiment, are designed in an alternative way. Accordingly, in the second exemplary embodiment, the beam direction inverters are each embodied as a combination of a spherical lens 226.1a, 226.2a and a reflector mirror 226.1, 226.2 at the focal point of the lens. In the beam path, in the beam propagation direction, the beam first passes through the lens 226.1a, 226.2a, then through the reflector mirror 226.1, 226.2, and finally back through the lens 226.1a, 226.2a again.

The wave front correctors 224.1a, 224.1b, 224.2a, 224.2b of the reflector units are embodied not as diffractive optical elements in the form of scanning gratings but rather as refractive optical elements. In contrast to the first exemplary embodiment of FIGS. 2-5, these elements do not have a mean optical deflection function for aiming the beam path parallel to the optical axis OA. Instead, in the X-Z plane, the mean beam direction from the scale 210 to the reflector mirrors 226.1, 226.2 is preserved.

In FIG. 8, two wave front correctors 224.1a, 224.1b of this exemplary embodiment are shown in schematic form. The requisite wave front corrector is accomplished here by a small, location-dependent (local) deflection function, which is achieved by the refraction at the saddle shape on the scanning plate 223.1 with its different surface inclination, and is equivalent to that of the diffractive optical elements or scanning gratings of the first exemplary embodiment. With a decreasing radial position (increasing Y values), the tangential deflection in the direction of the optical axis OA becomes greater.

The production of the refractive wave front correctors 224.1a, 224.1b can be done for instance by pressing the corresponding components into a suitable negative mold or by milling and ensuing local polishing. A rectangular glass rod could also be turned into a helix by hot deformation and then ground flat and polished on the back side.

With the exception of the components described above, the second exemplary embodiment basically matches the first exemplary embodiment.

Third Exemplary Embodiment

Figure 9:
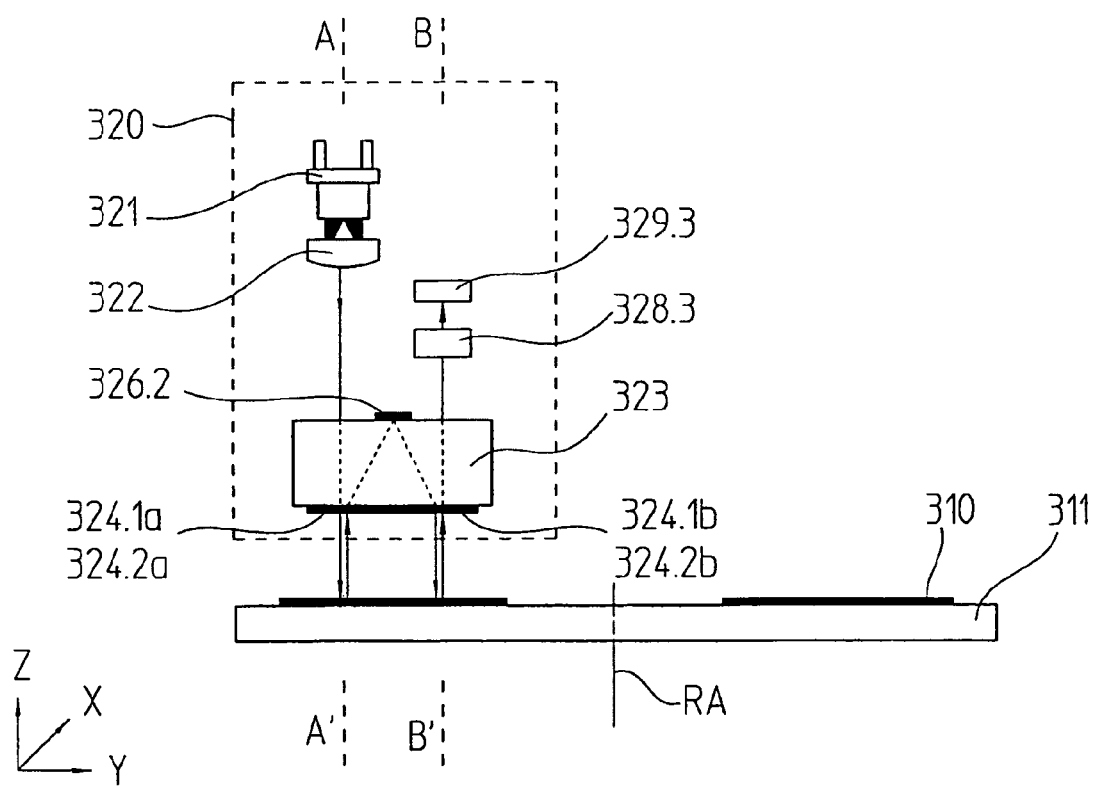
FIGS. 9, 10a, 10b each show part of a possible scanning beam path of a third embodiment of the optical position measuring instrument of the present invention, in different views.
Figure 10A:
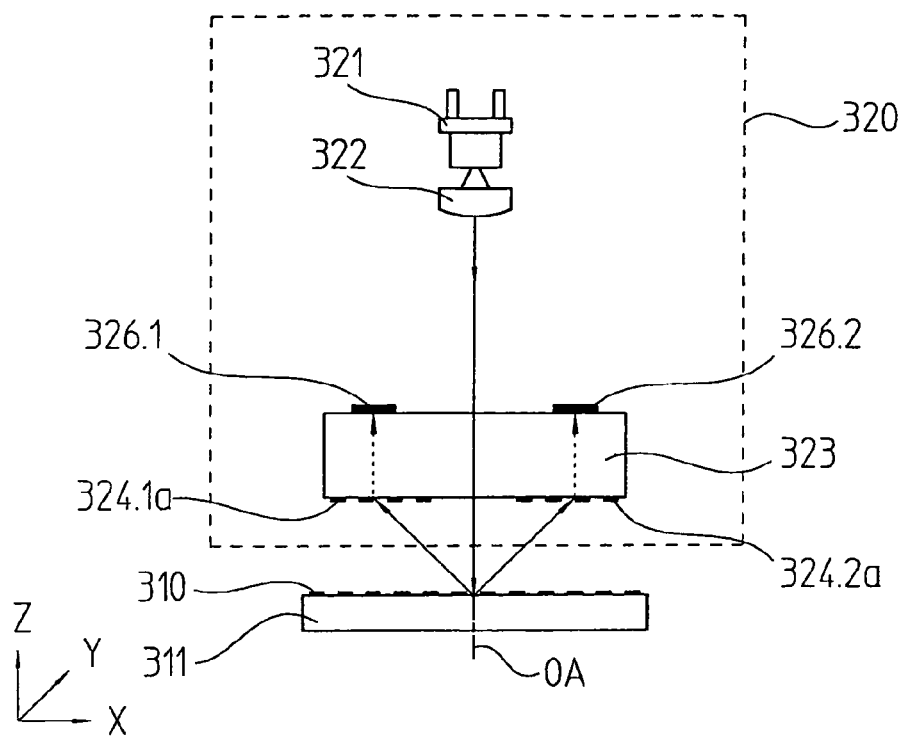
Figure 10B:
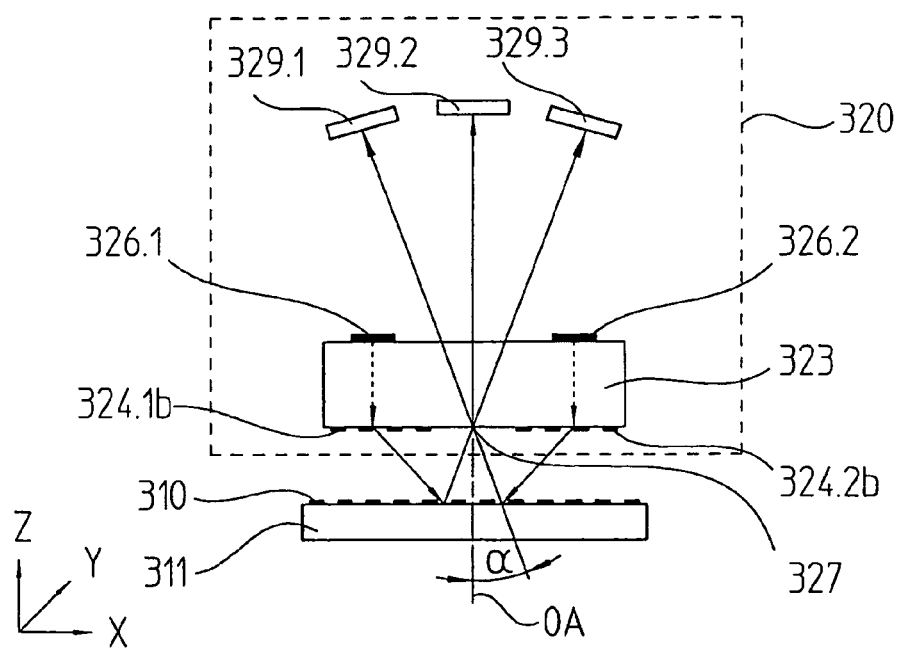

The fundamental construction of a third exemplary embodiment of the optical position measuring instrument of the invention is shown in FIGS. 9, 10a and 10b. These illustrations in turn correspond to the scanning beam path illustrations of the first and second exemplary embodiments of FIGS. 2-8. Below, only the definitive differences from the previous exemplary embodiments will be explained.

The beam emitted by a light source 321 embodied as a laser diode is collimated by a collimating optical system 322 and reaches the graduated disk 311. The scale 310 embodied as a radial graduation is in turn disposed on the graduated disk 311. The partial beams, deflected with the +1st and −1st orders of diffraction then strike respective first scanning gratings 324.1a and 324.2a, or in other words strike diffractive optical elements.

The scanning gratings 324.1a, 324.2a combine different optical functions in this exemplary embodiment; that is, once again they are embodied as diffractive optical combination elements. On the one hand, they each include a wave front corrector functionality and deflection functionality as in the first exemplary embodiment. By way of them, the incident partial beams are thus deflective parallel to the optical axis OA, and the wave fronts of the partial beams are corrected such that they are initially planar. In addition, the scanning gratings 324.1a, 324.2a include an optical lens functionality, by way of which the partial beams are focused at the reflector mirrors 326.1, 326.2. The location ($X_{P1}$, $Y_{P1}$), ($X_{P1}$, $Y_{P1}$) of the respective lens foci is thus obtained by the following Equations 3.1-3.3:

$$X_{P1}=-XL \quad \text{(Equation 3.1)}$$

$$X_{P2}=+XL \quad \text{(Equation 3.2)}$$

$$Y_{P1}=Y_{P2}=R_A \quad \text{(Equation 3.3)}$$

Accordingly, the scanning gratings 324.1a, 324.2a combine the optical functions of the wave front correctors with the optical functionality of the lens element of the beam direction inverter from the previous exemplary embodiment.

For implementing various optical functionalities in a single diffractive optical element or scanning grating, the various phase displacements, which each optical element or optical function is supposed to produce, are added up, and these phase displacements are made equivalent to the phase function of the corresponding diffractive optical element. This phase function then either directly yields the structure of a blazed diffractive optical element with the typical sawtooth-shaped profiles, or is quantized, for instance in order to describe binary or four-stage diffractive optical elements. Binary phase grating structures with a phase depth of 180° are in turn especially economical.

By the scanning gratings 324.1a and 324.2a, the partial beams are focused at the respective reflector mirrors 326.1 and 326.2 and, after reflection, they reach further scanning gratings 324.1b and 324.2b. These scanning gratings 324.1b and 324.2b likewise include a plurality of optical functions. By way of an optical lens functionality embodied therein, the partial beams are first collimated again and then, via the optical functionality of a wave front corrector and a deflection function, predistorted in such a way that the partial beams, after rediffraction at the scale 310, are collimated, but are propagated at a beam angle α relative to the optical axis OA. The resultant beam angle α is determined such that both partial beams overlap completely at a combining grating 327 on the underside of the scanning plate 323. The combining grating 327 mixes the two partial beams in a known manner and in the resultant 0th and ±1st orders of diffraction, wherein the combining grating 327 generates phase-offset partial beams that are detected by the detector elements 329.1-329.3 of the detector unit. In this exemplary embodiment, polarization-optical components are not needed for generating the phase-offset position signals. In this exemplary embodiment, the detector element therefore includes only the detector elements 329.1-329.3. A phase offset of the partial beams of preferably 120° can be achieved by a suitable choice of the phase depth and bar width of the combining grating 327, as is disclosed for instance in EP 0 163 362 B1. The grating constant of the combining grating 327 should be dimensioned such that the partial beams striking it are deflected by diffraction each in a first order of diffraction parallel to the optical axis OA.

Thus, the beam direction inverters of this exemplary embodiment includes the optical lens functionality of the scanning gratings 324.1a, 324.2a as well as the reflector mirror 326.1, 326.2. The beam then travels in the beam path in the beam propagation direction through the optical lens or the scanning gratings 324.1a, 324.2a, the reflector mirror 326.1, 326.2, and then again through the optical lens or scanning gratings 324.1a, 324.2a.

Modified Variant of the Third Exemplary Embodiment

Figure 11A:
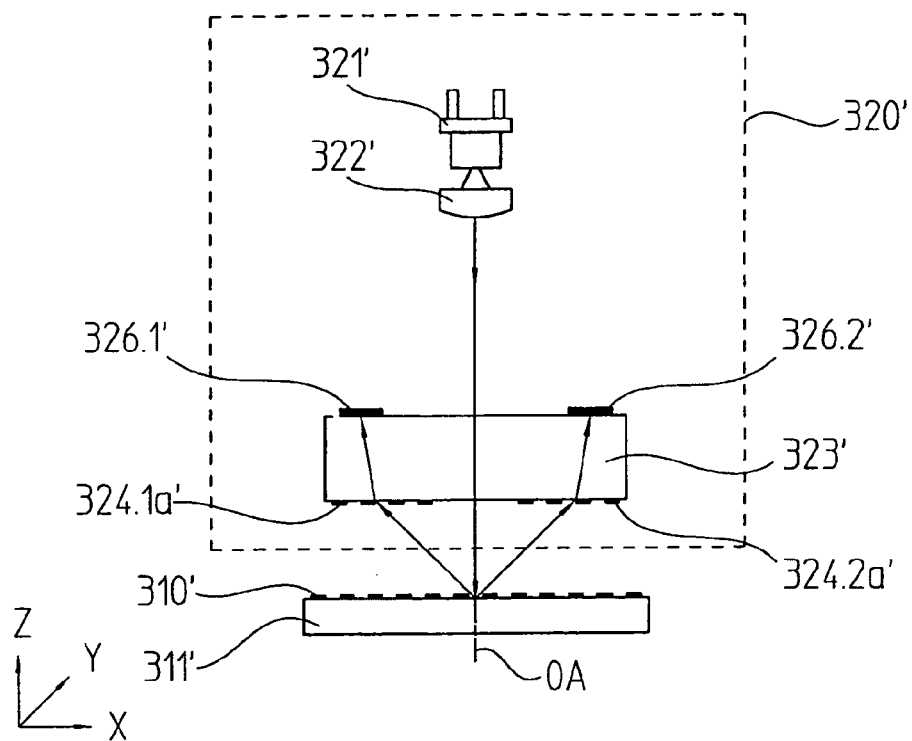
FIGS. 11a, 11b each show part of a possible scanning beam path of a modification of the third embodiment of the optical position measuring instrument of the present invention, in different views in accordance with the present invention.
Figure 11B:
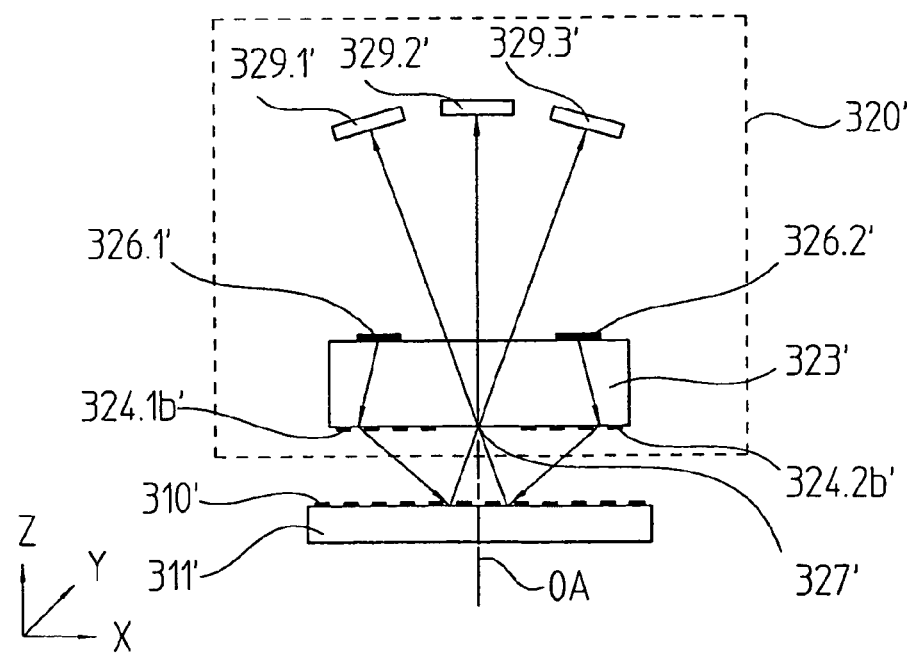

If in the third exemplary embodiment described above the condition that the partial beams are propagated inside the scanning plate 323 parallel to the optical axis OA is dispensed with, the result is a modified variant of the third exemplary embodiment of FIGS. 9-10, which is shown in FIGS. 11a and 11b.

Here, the scanning gratings 324.1a', 324.2a' as well as 324.1b', 324.2b' include the optical functionalities described above. However, the mean optical deflection functionality in the measurement direction X of the scanning gratings 324.1a', 324.2a' is chosen to be less, and that of the scanning gratings 324.1b', 324.2b' is chosen to be greater, so that the partial beams at the combining grating 327' in turn overlap. In this variant of the optical position measuring instrument of the invention, the partial beams, as can be seen, extend obliquely to the optical axis OA inside the scanning plate 323'.

The offset in the Y direction between the beam path from the light source 321' to the first diffraction at the scale 310' and the beam path after the second diffraction at the scale 310' is determined by the choice of the Y location of the lens foci of the optical lens functionality of the respective scanning gratings 324.1a', 324.2a', as well as 324.1b', 324.2b'. This offset of the beam paths is chosen to be at least great enough that the beam path from the light source 321' to the first diffraction at the scale 310' does not overlap with the beam path after the second diffraction at the scale 310'. However, the offset can also be chosen to be so great that an additional graduation track—not shown—is inserted at the radius $R_A$ on the scale 310'. This kind of graduation track could be used to generated a reference pulse signal, as is disclosed for instance in EP 1 923 673 A2 of the present Applicant.

Calculating the phase functions of the scanning gratings 324.1b' and 324.2b' is done analogously to the first exemplary embodiment of FIGS. 2-5. By reverse propagation of the collimated beam from the detector elements 329.1'-329.3' of the detector unit to the diffractive scanning gratings 324.1b' and 324.2b' respectively, a first wave front deformation or phase displacement is calculated. By forward propagation from the focus at the reflector mirrors 326.1' and 326.2', a second phase displacement is calculated. The difference between the two phase displacements is then precisely equivalent to the phase that the corresponding diffractive optical element is intended to introduce and thus represents the phase function of that diffractive optical element.

Figure 12:
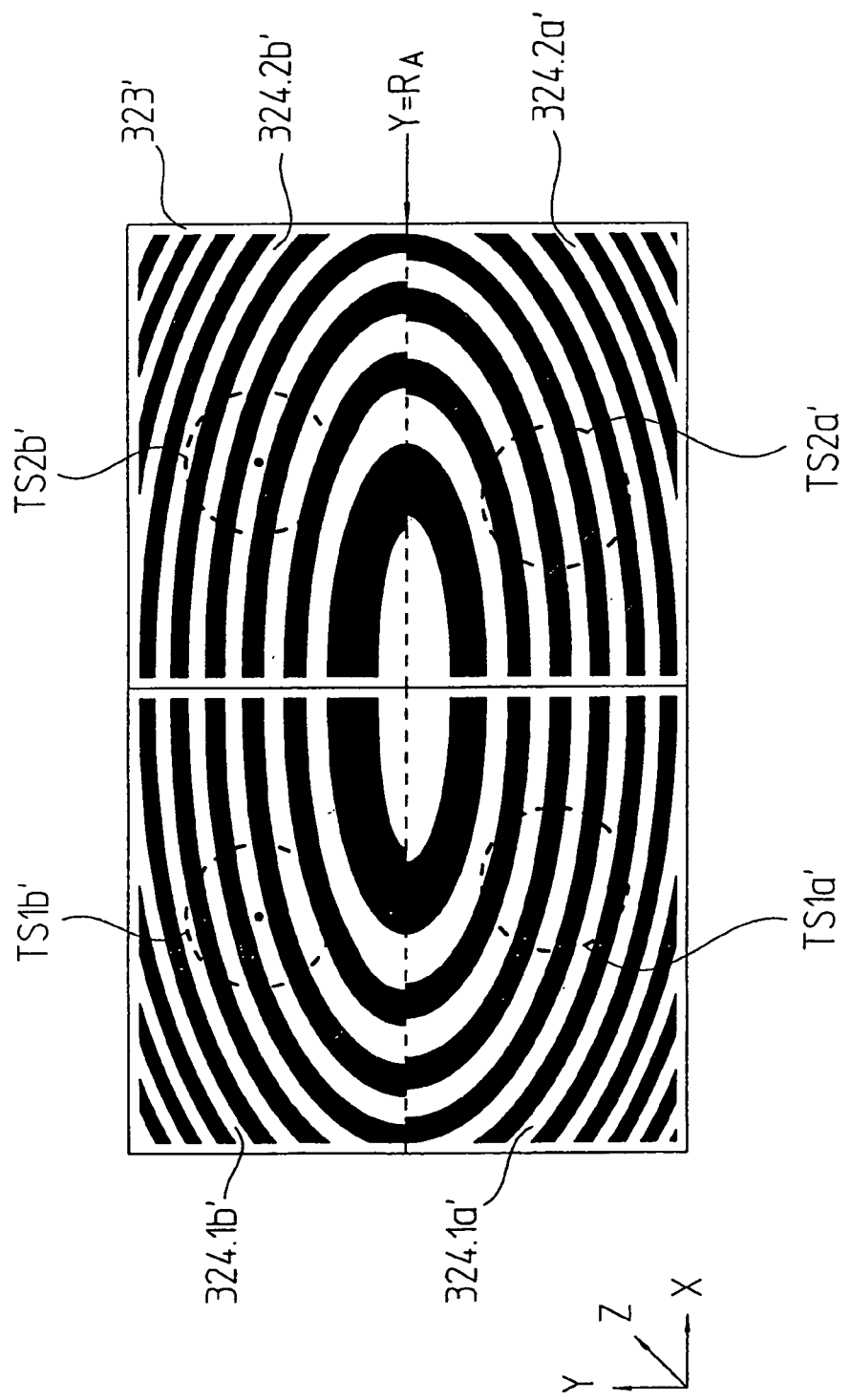
FIG. 12 is a schematic view of embodiments of wave front correctors of the optical position measuring instrument in FIGS. 11a, 11b in accordance with the present invention.

In FIG. 12, a greatly coarsened structure of the scanning gratings 324.1a', 324.1b' and the scanning gratings 324.2a' and 324.2b' that are mirror-symmetrical to them are shown in this variant of the optical position measuring instrument of the invention.

By way of the combination of the various optical functionalities in diffractive scanning structures or scanning gratings, this embodiment of the optical position measuring instrument of the present invention can be made very compact and economical. Since moreover the reflector mirrors 326.1', 326.2' are mounted monolithically on the scanning plate 323', the result is a simple, robust construction of the scanning unit 320' that is not sensitive to vibration and temperature.

For further reducing the tolerance-dictated wave front deformations, it has proved advantageous to choose the focal lengths of the lenses, which are integrated with the first and second scanning gratings 324.1a', 324.2a', 324.1b' and 324.2b', as not identical but rather somewhat different. If f1 is the focal length, measured in the scanning plate medium, of the first lens and f2 is the corresponding focal length of the second lens, then the combination of the two lenses should continue to convert a collimated partial beam into a collimated partial beam; that is, the following should apply:

$$f1+f2=2\cdot D \quad \text{(Equation 4)}$$

in which
f1=focal length of the first lens
f2=focal length of the second lens
$D_A$=thickness of the scanning plate.

It is especially favorable if a ratio of the focal lengths f1/f2 is selected in accordance with the associated ratio of the scanning radii r1 and r2 of the first and second scanning points, respectively, on the scale 310', in accordance with the following Equation 5:

$$f1/f2=r1/r2 \quad \text{(Equation 5)}$$

By way of this condition a so-called Kepler telescope is characterized, which has a negative imaging ratio and projects the first, outer scanning point, reduced in size, onto the second, inner scanning point (or alternatively, it projects the inner scanning point in enlarged form onto the outer scanning point). If there is a small radial or tangential displacement of the graduated disk 311', local wave front tilting occurs, which decreases with a greater radius. This dependency is compensated for by the above condition in accordance with Equation 5, because changes in beam direction upstream of the long-focal-length lens of the outer scanning point are converted into greater changes in beam direction downstream of the short-focal-length lens for the downstream inner scanning point. This optimization can be refined still further by determining, within each scanning point, local lens focal lengths f1 (x, y) and f2 (x', y'), which satisfy Equation 4 for each first scanning point (x, y) and the associated second scanning point (x', y'), and moreover the local changes in beam direction for the radial and tangential directions are transmitted in each case from the first to the second scanning point in such a way that they optimally compensate for the aforementioned radial dependency of the wave front tilting. As a result, still greater mounting tolerances are achieved.

Fourth Exemplary Embodiment

Figure 13:
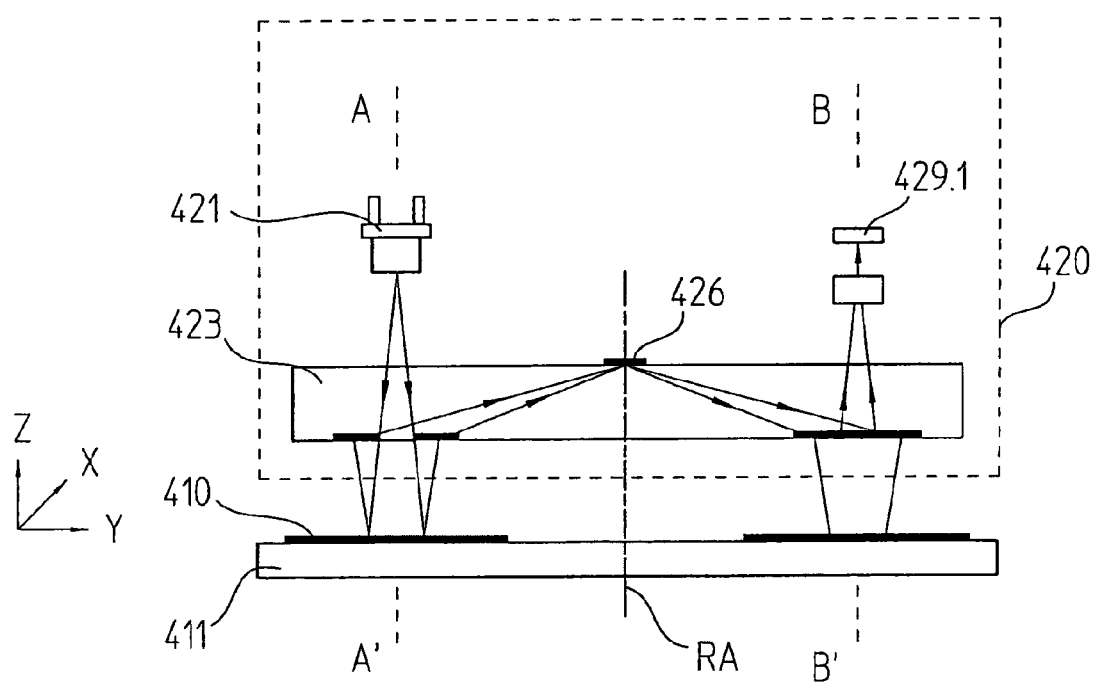
FIGS. 13, 14a, 14b each show part of a possible scanning beam path of a fourth embodiment of the optical position measuring instrument of the invention, in different views in accordance with the present invention.
Figure 14A:
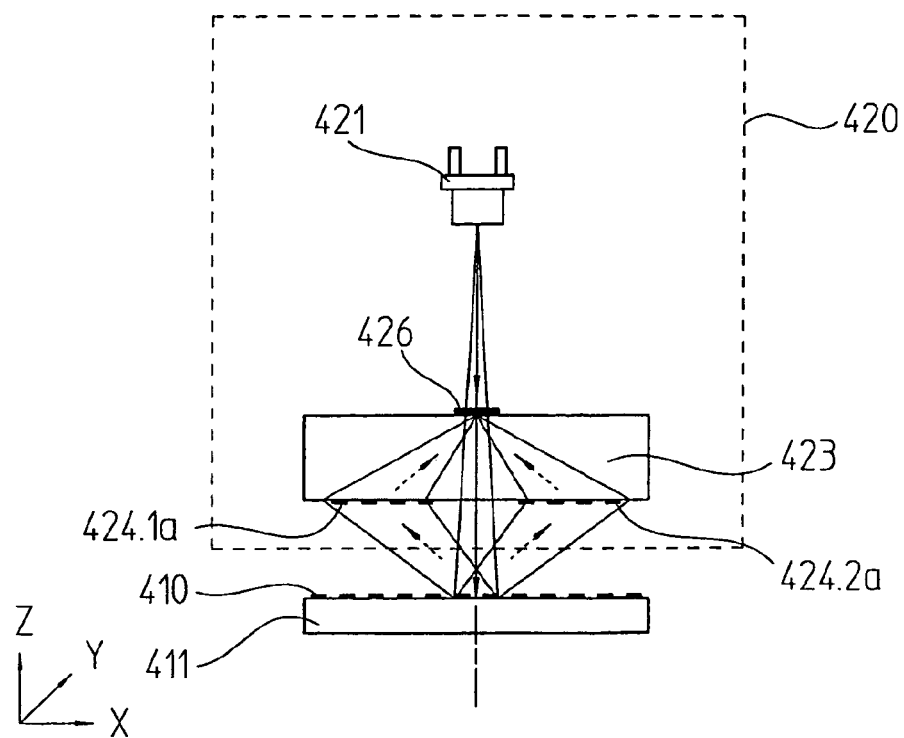
Figure 14B:
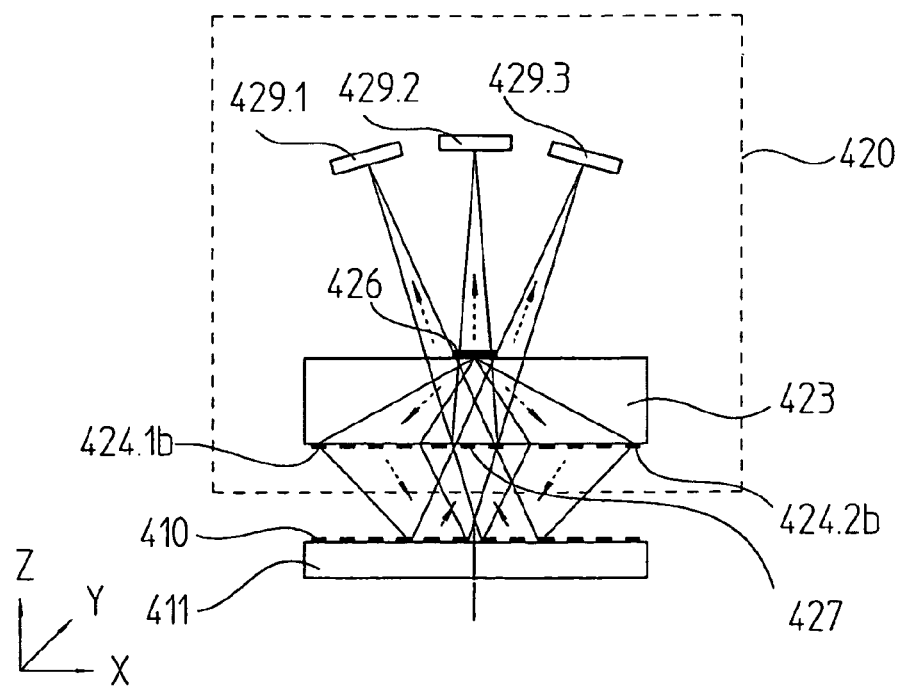

The basic construction of a fourth exemplary embodiment of the optical position measuring instrument of the present invention is shown in FIGS. 13, 14a, and 14b. The views correspond to the scanning beam path views in the foregoing exemplary embodiments. Below, once again, only the definitive differences from the exemplary embodiments described above will be explained.

In the fourth exemplary embodiment of the optical position measuring instrument of the present invention, a divergent light source now illuminates the scale 410 on the graduated disk 411. Preferably, a so-called VCSEL (Vertical Cavity Surface Emitting Laser) is used as the light source. Accordingly, a collimating optical element is not provided.

The divergent beam is diffracted or split at the scale 410 into ±1st orders of diffraction. The first scanning gratings 424.1a, 424.2a again combine a plurality of optical functionalities. For instance, the optical functionality of a lens for collimating the divergent partial beams, the optical functionality of a wave front corrector for the wave front deformations by the scale 410, embodied as a radial graduation, on the graduated disk 411, and the optical functionality of a focusing lens, which focuses the partial beams on the center of the top side of the scanning plate 424, are embodied in this way. After the reflection of the partial beams at the reflector mirror 426, the partial beams reach second scanning gratings 424.1b, 424.2b, which likewise have a plurality of optional functionalities. For instance, the second scanning gratings 424.1b, 424.2b collimate the divergent partial beams, subject them to a wave front corrector for the ensuing diffraction at the scale 410 or radial graduation, and focus the partial beams at the detector elements 429.1-429.3 of the detector unit. Finally, a combining grating 427 causes the two partial beams to interfere with one another.

The special aspect of this exemplary embodiment is the diametrical scanning of the scale 410 on the graduated disk 411. As a result, possible measurement errors if the graduated disk 411 shifts in the X-Y plane are averted. Also in this embodiment, the ideal beam direction inverter is a retroreflector, which as in the third exemplary embodiment comprises the optical lens functionality of the scanning gratings 424.1a, 424.2a, 424.1b, 424.2b and the reflector mirror 426. In the beam path, once again the passage is through the optical lens or scanning gratings 424.1a, 424.2a, the reflector mirror 426, then back again through the lens or the scanning gratings 424.1b, 424.2b.

In the exemplary embodiments described above, in which the optical position measuring instrument of the present invention in each case includes a scanned radial graduation as its scale, a number of different options exist for implementing the reflector unit in the scanning unit. However, with all the various options for implementation, the following optical functionalities of the reflector unit are ensured:

A small radial (tangential) change in beam direction of the incident partial beam is converted into an essentially opposed radial (tangential) change in the beam direction of the exiting partial beam.

A small radial (tangential) change in beam position of the incident partial beam is converted into an essentially opposed change in beam position of the exiting partial beam.

The wave front deformation that occurs because of the first diffraction at the radial graduation is converted into a wave front deformation that compensates for the wave front deformation caused by the second diffraction at the radial graduation.

Fifth Exemplary Embodiment

Below, different variants of a fifth exemplary embodiment of the optical position measuring instrument of the present invention will now be described. These differ from the examples described thus far essentially in that the scanned scale is embodied as a drum graduation on the outer circumference of a rotating graduation drum. The axis of rotation here coincides with the longitudinal axis of the graduation drum.

Figure 15:
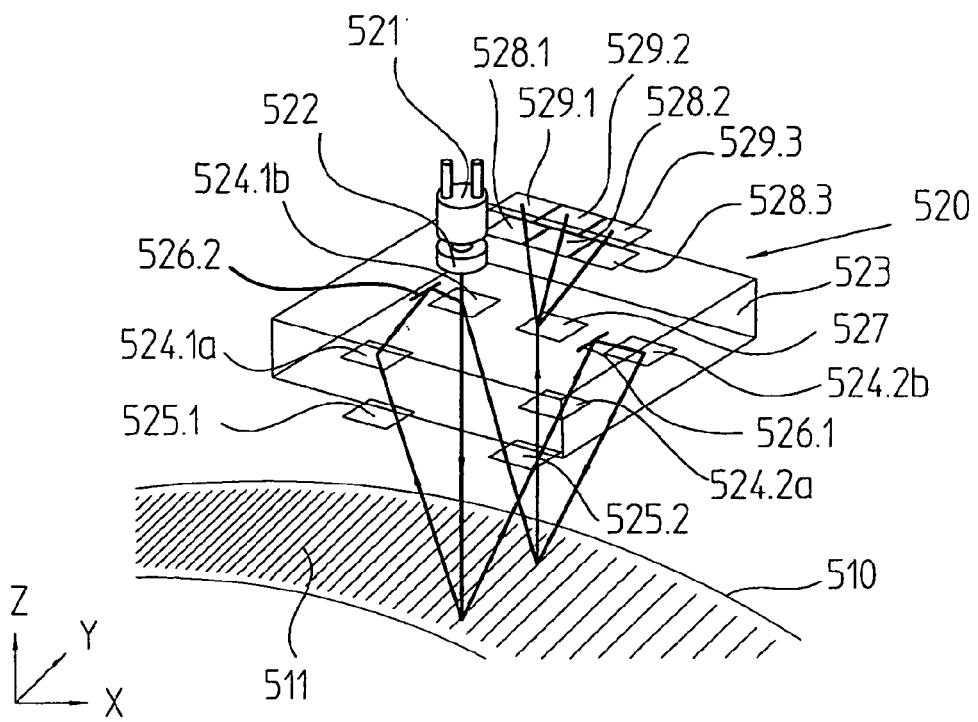
FIG. 15 is a schematic view of a possible scanning beam path of a first variant of the fifth embodiment of the optical position measuring instrument of the present invention.
Figure 16:
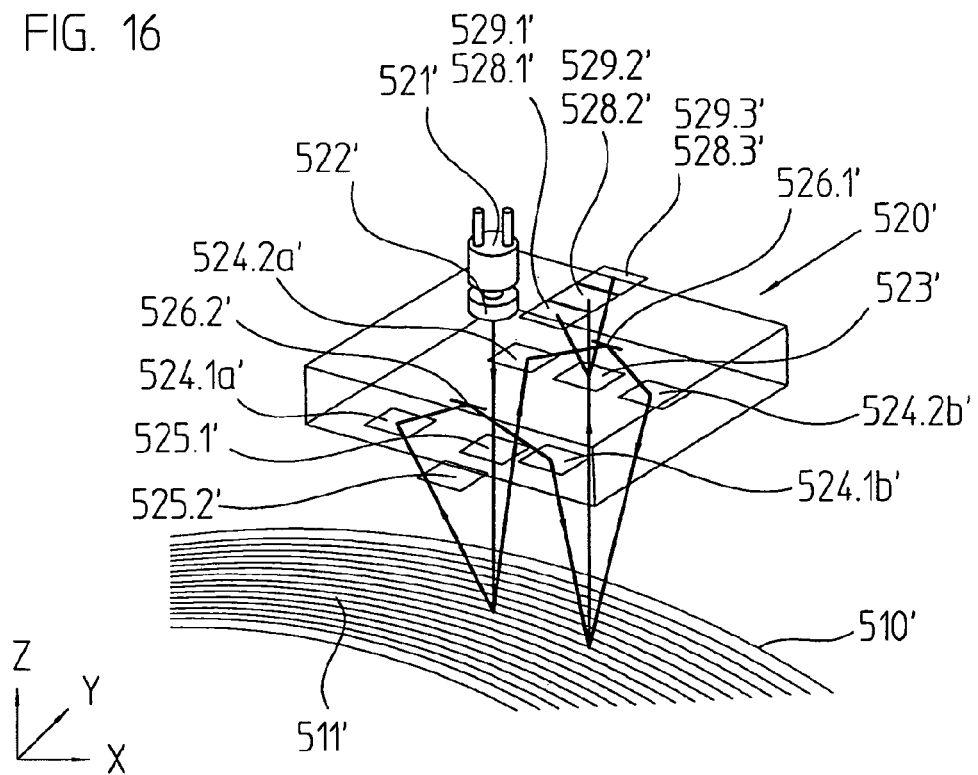
FIG. 16 is a schematic view of a possible scanning beam path of a second variant of the fifth embodiment of the optical position measuring instrument of the present invention in accordance with the present invention.

The construction of a first and second variant of the fifth exemplary embodiment is shown schematically in FIGS. 15 and 16. These two variants differ in that the measurement direction of the scanning is oriented in the tangential direction x in the variant of FIG. 15 and in the axial direction y in the variant of FIG. 16. This means that via the optical position measuring instrument of the present invention shown in FIG. 15, the azimuth angle of the rotating graduation drum 510 can be determined, while conversely via the variant of FIG. 16, the axial displacement of the graduation drum 510' can be determined.

In principle, the scanning in these two variants of the fifth exemplary embodiment corresponds to the scanning described for the foregoing exemplary embodiments, particularly with regard to the embodiment of a reflector unit with first and second wave front correctors and with a beam direction inverter. Accordingly, only a few notable aspects of these variants will be addressed briefly below.

The beam collimated by a collimator optical element 522, 522' reaches the graduation drum 510, 510', on the outer circumference of which the scale 511, 511' is disposed in the form of a drum graduation. The scale 511 in FIG. 15 has graduation grating lines in the axial direction; in the scale 511' in FIG. 16, the grating lines are oriented in the tangential direction. The partial beams deflected or split with ±1st orders of magnitude experience a deformation of their respective wave fronts as a result of the reflection at the curved drum graduation.

In the case of the variant of FIG. 16, the collimated beam striking the scale 511' moreover does meet the graduation drum 510' at its apex. The orders of diffraction or partial beams reflected by the scale 511' here additionally experience an inclination in the x direction perpendicular to the measurement direction.

The diffractive optical elements or scanning gratings 524.1a, 524.2a and 524.1a', 524.2a', by their suitably selected phase function, compensate for these wave front deformations and, in the case of FIG. 16, the resultant beam inclination, and they focus the partial beams at the reflector mirrors 526.1, 526.2 and 526.1', 526.2'. From there, divergent partial beams arrive at the scanning gratings 524.1b, 524.2b and 524.1b', 524.2b', which are also embodied as diffractive optical elements. Their phase function here is identical, except for the respective sign [i.e., + or −], to the phase function of the first scanning gratings 524.1a, 524.2a and 524.1a', 524.2a'. After another reflection at the scale 511 and 511', respectively, the two partial beams again have planar wave fronts and then interfere with one another. The scanning gratings 524.1a, 524.2a and 524.1a', 524.2a' once again combine the optical functionalities of a wave front corrector, a lens, and a beam deflector.

The lens function embodied in the scanning gratings 524.1a, 524.2a and 524.1a', 524.2a' can, as in the second, third and fourth exemplary embodiments, be embodied as a spherical lens function. However, in scanning of the graduation drum 510, 510' in FIGS. 15 and 16, the wave front distortions occur essentially only in the tangential direction. In the axial direction, the graduation drum 510, 510' is rectilinear, and the deflection effect of the scale 511, 511' or drum graduation is constant. The conclusion might be drawn that a retroreflection in the axial direction is not absolutely necessary. However, it should be taken into account here that a retroreflection perpendicular to the measurement direction is required in every case, in order to reduce the well-known sensitivity of the scanning optics to tilt about the optical axis OA ("moiré tilting"). In this connection, German Patent Disclosure DE 10 2005 029 917 A1 of the present Applicant is expressly incorporated by reference. It follows from this that in the variant in FIG. 16, with an axial measurement direction, a complete retroreflection can be dispensed with only when scanning a graduation drum 510'. In all other cases, including the scanning of radial graduations, a beam direction inverter with a complete retroreflection is required. The complete retroreflection can be implemented, as described above, by way of a triple prism, a triple mirror, a combination of a spherical lens and a reflector mirror, and a combination of a roof prism and a cylindrical lens with a lens effect parallel to the roof. For the incomplete, monoaxial retroreflection, conversely, either a roof prism or a combination of a cylindrical lens and a reflector mirror is required. In the variant in FIG. 16, the orientation of the monoaxial retroreflection must be done such that the roof of the roof prism is oriented in the axial direction and focuses the cylindrical lens in the tangential direction.

As in the first exemplary embodiment described above, in the two variants of FIGS. 15 and 16 the generation of the phase-offset position signals is done by polarization optical means. However, here as well—analogously to the third exemplary embodiment—the phase-offset position signals can be obtained diffractively via a scanning beam path, with a suitably embodied combining grating.

Optionally, the particular measurement task may require detecting both the axial displacement and the azimuth angle of the graduation drum 510 and 510'. In that case, it is possible to combine the scales 511 and 511' and to embody them as a cross-grating graduation on the outer circumference of a graduation drum. This reduces both the required installation space for the optical position measuring instrument of the invention and the moment of inertia of the graduation drum. Also in this case, the complete six-dimensional location of the graduation drum can be determined by using what is then a total of six scanning units.

Figure 17:
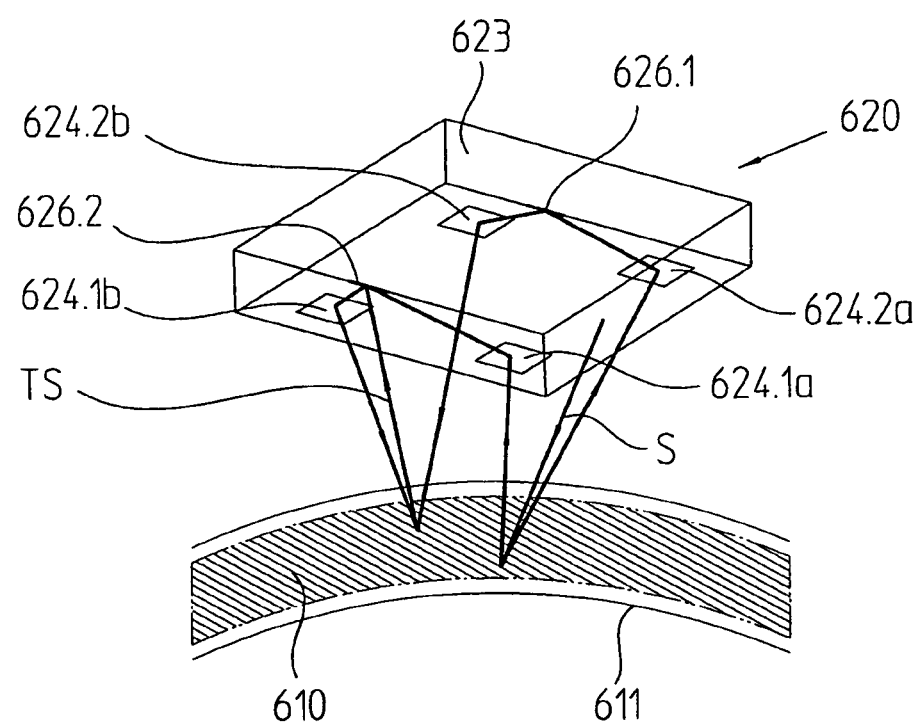
FIG. 17 is a schematic view of a possible scanning beam path of a third variant of the fifth embodiment of the optical position measuring instrument of the present invention in accordance with the present invention.
Figure 18:
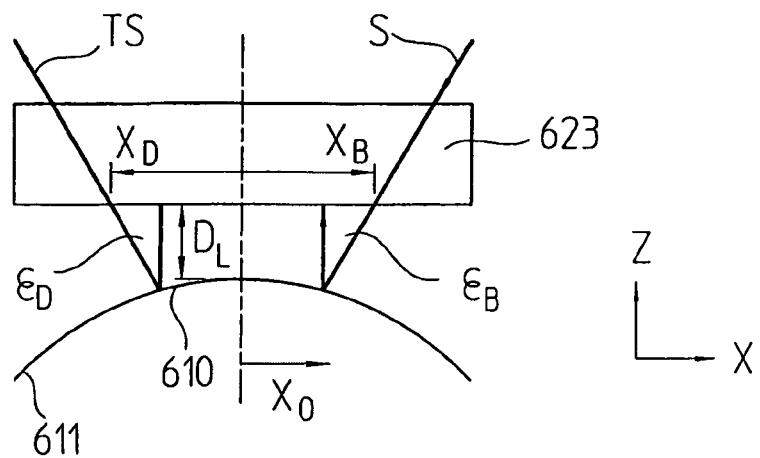
FIG. 18 shows various geometrical relationships in the variant of FIG. 17.
Figure 18:
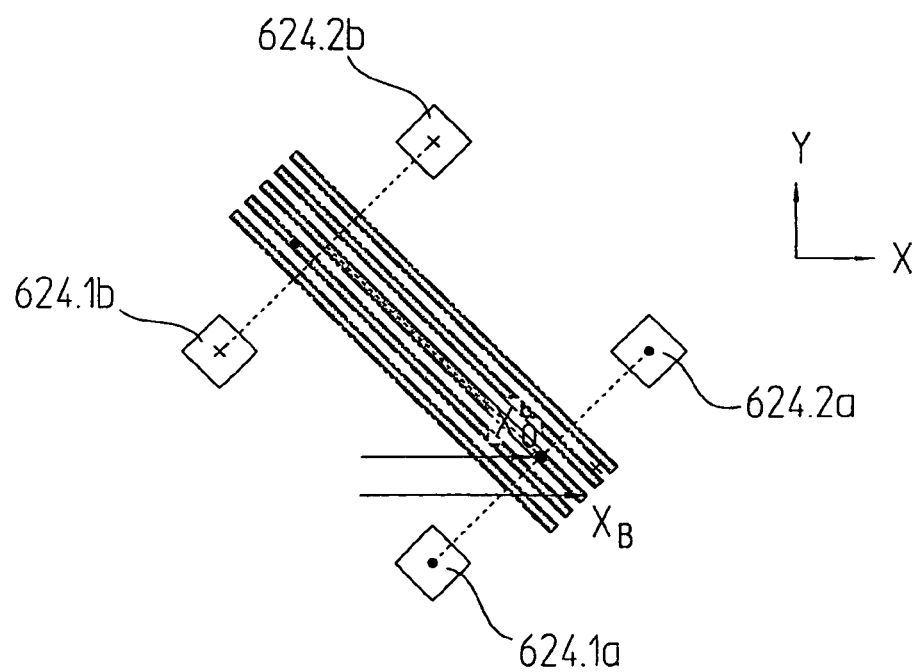

A third variant of the fifth embodiment of the optical position measuring instrument of the invention is shown in fragmentary form in FIG. 17; FIG. 18 serves to explain certain geometric dimensioning rules of that variant below. This variant of the optical position measuring instrument of the invention can, like the second variant described above, be used with a cross-grating graduation—not shown—for detecting both the axial displacement and the azimuth angle of the respective graduation drum 610 or 510' or for determining the six-dimensional location of the graduation drum 611 via six scanning units 620. For that purpose, a scanning unit is employed whose measurement direction is rotated about the normal to the surface of the outer circumference of the drum. This is achieved by an orientation of the grating lines of the scale 610 in such a way that the scale too is likewise rotated about the aforementioned surface normal. A symmetrical rotation of the two measurement directions of a cross grating graduation by approximately ±45° has the advantage that two different kinds of scanning units with different diffractive optical elements do not have to be produced in the scanning plate. Instead, identical scanning units, which however are rotated with respect to one another about the aforementioned normal direction, are used.

In this kind of embodiment of the scale, because of the lateral offset of the impact points by the scanning partial beams given vertical illumination relative to the scanning plate, the two first-order partial beams reflected back by the scale would strike the scanning plate asymmetrically. As a consequence, two first diffractive optical elements, such as the two first scanning gratings 624.1a, 624.2a, which among other things are intended to correct the distortion of the wave fronts, that the beams first pass through would likewise not be identical after the mirror reflection. The result is a highly variable deformation of the wave fronts of the two partial beams interfering with one another, if the mounting is not ideal or if there is a deviation in the wavelength of the light source from the wavelength specified in the design. That would accordingly lead to a rapid drop in the degree of modulation and thus in the signal magnitude of the position signals generated.

This asymmetry of the first diffractive optical elements 624.1a and 624.2a and the attendant reduced mounting tolerance can be overcome by an oblique incidence of the illuminating beam S and a likewise oblique exit of the two partial beams TS interfering with one another, as is illustrated in FIG. 17 and in the upper part of FIG. 18.

This is attained approximately because the passage point through the scanning plate 623 and the angle of incidence $\epsilon_B$ of the illuminating beam S are selected such that the 0th orders of the partial beam, reflected back by the scale 610 or drum graduation, arrives vertically and centrally between the two first scanning gratings 624.1a and 624.2a, as is indicated in FIG. 18.

The angle of incidence $\epsilon_B$ of the illuminating beam S is therefore preferably selected as follows:

$$\epsilon_B = \arctan\left(\frac{2x_0\sqrt{R^2 - x_0^2}}{R^2 - 2x_0^2}\right) \quad \text{(Equation 6)}$$

in which
$x_0$=scanning location upon first diffraction at the scale in the x direction
R=radius of the graduation drum.
For large drum radii R, the following is approximately true:

$$\epsilon_B = \frac{2x_0}{R} \quad \text{(Equation 6.1)}$$

The x coordinate for the passage point of the illuminating beam S through the underside of the scanning plate 623 is:

$$x_B = \frac{x_0 R^2 - 2x_0(D_L + R)\sqrt{R^2 - x_0^2}}{2x_0^2 - R^2} \quad \text{(Equation 7)}$$

in which
$D_L$=scanning spacing between the apex of the graduation drum and the scanning plate.
For large drum radii R, the following is approximately true:

$$x_B = x_0\left(2\frac{D_L + R}{R} - 1\right) \quad \text{(Equation 7.1)}$$

The y coordinate for the passage point of the illuminating beam S through the underside of the scanning plate 623 corresponds to the mean value of the y coordinates of the first scanning gratings 624.1a and 624.2a in accordance with the following:

$$y_B = \frac{y_{624.1a} + y_{624.2a}}{2} \quad \text{(Equation 8)}$$

The corresponding geometric variables (exit angle; puncture coordinates) for the exiting interfering beams TS becomes:

$$x_D = -x_B \quad \text{(Equation 9.1)}$$

$$y_D = \frac{y_{624.1b} + y_{624.2b}}{2} \quad \text{(Equation 9.2)}$$

$$\epsilon_D = \epsilon_B \quad \text{(Equation 9.3)}$$

Using oblique illumination is helpful for all scans in which the measurement direction does not extend in the tangential or axial direction. In that case, symmetrically embodied scanning gratings 624.1a, 624.2a and 624.1b, 624.2b can thus be placed; moreover, high tolerances with regard to the rated location of the graduation drum are then available. In this respect it is useful to select the first and second scanning points on the scale 610 or the graduation drum symmetrically around the drum apex in the x direction. As a consequence, the wave front correctors take on the correction of the wave front that is curved because of the drum curvature, while the tilting of the wave front is compensated for by the oblique illumination.

For the drum scanning, As in the first exemplary embodiment with radial grating scanning described above, a retroreflector proves to be the ideal solution for the beam direction inverter. This can be ascribed to the fact that if there are deviations in the graduation drum from its rated location, tolerance-dictated wave front deformations occur, which essentially represent wave front tilting and thus beam inclinations. These beam inclinations are inverted by the retroreflection, so that after again being diffracted at the scale 610, the inclinations are canceled out again and lead to an optimal interference of the two partial beams.

Sixth Exemplary Embodiment

Figure 19:
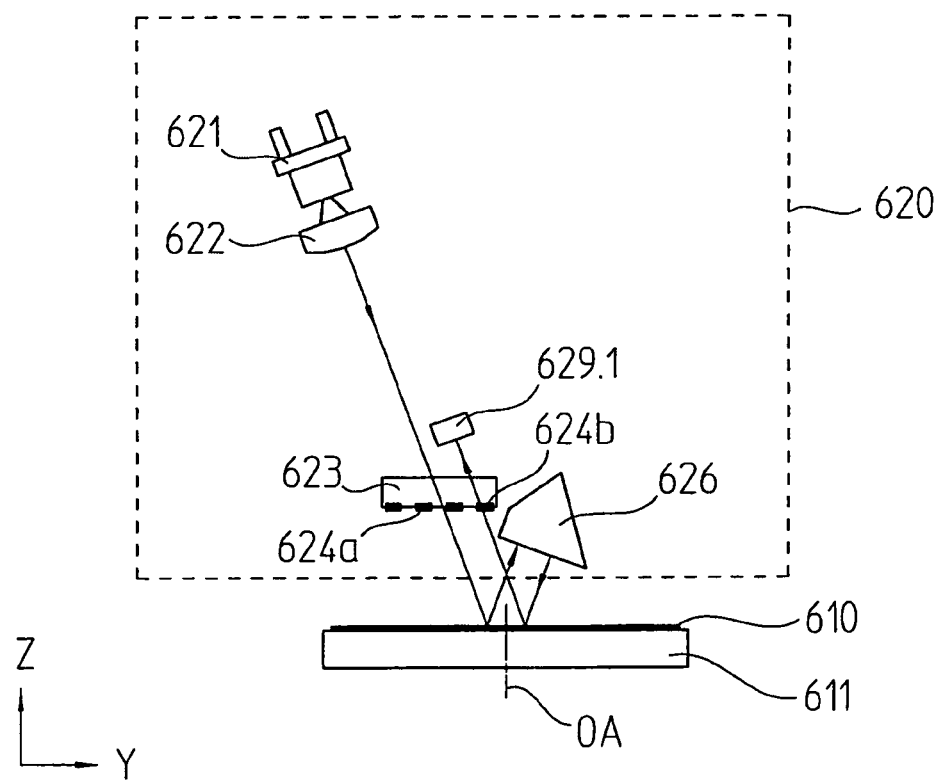
FIGS. 19, 20a, 20b each show part of a possible scanning beam path of a sixth embodiment of the optical position measuring instrument of the present invention, in different views in accordance with the present invention.
Figure 20A:
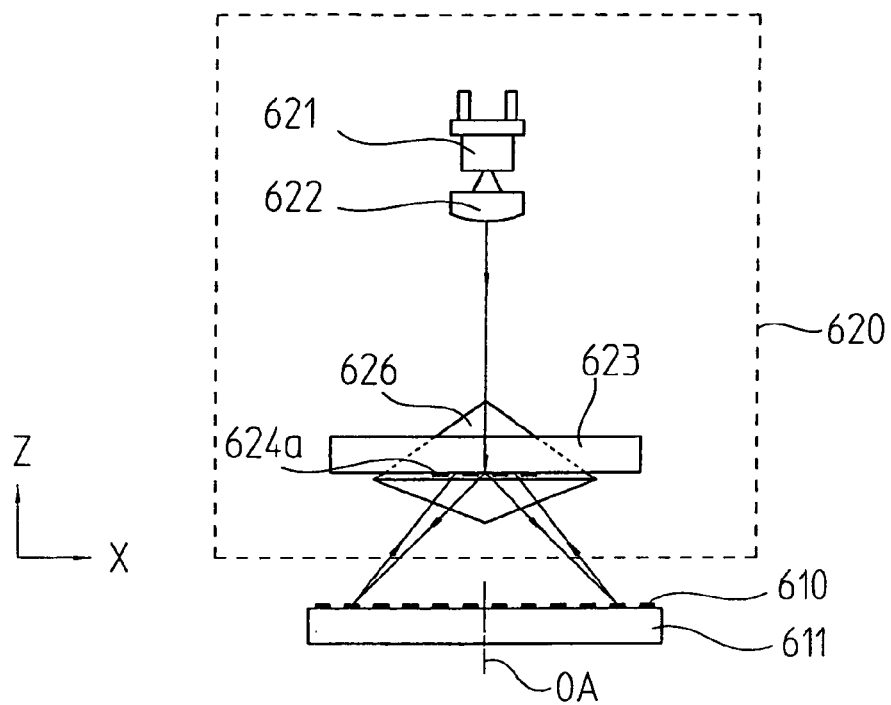
Figure 20B:
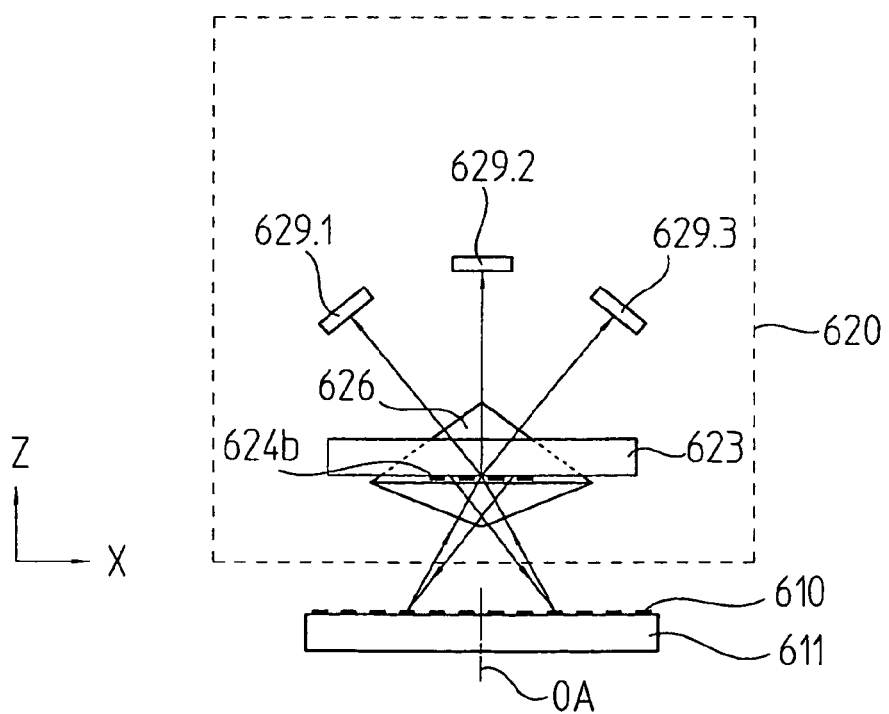

Finally, a sixth exemplary embodiment of the optical position measuring instrument of the present invention will be described in conjunction with FIGS. 19, 20a and 20b.

In the exemplary embodiments described thus far, it was always provided that the scale, the two wave front correctors, and the beam direction inverter are passed through by the beams or partial beams in the beam propagation direction in the following order:

Scale (first diffraction) first wave front corrector-beam direction inverter-second wave front corrector-scale (second diffraction)

The various elements in the optical position measuring instrument of the present invention were disposed in that order.

However, in the context of the present invention, it is also possible for the beams or partial beams to pass through these elements in the following order instead:

First wave front corrector-scale (first diffraction)-beam direction inverter-scale (second diffraction)-second wave front corrector Very generally, one can therefore say that according to the present invention, the reflector unit is disposed and/or embodied in the scanning unit such that the beams first pass through a first combination of a scale and the first wave front corrector, then via the beam direction inverter a back reflection of partial beams in the direction of the scale takes place, and the partial beams then pass through a second combination of the scale and the second wave front corrector, before the partial beams then reach the detector unit.

One exemplary embodiment of the optical position measuring instrument, in which the beams pass through the various elements in the second order mentioned above, is shown in FIGS. 19, 20a and 20b.

The beam emitted by the light source 621 is collimated via the collimating optical element 622 and arrives at a first scanning grating 624a, which is disposed on a scanning plate 623. Via the first scanning grating 624a, the incident beam is split into two diffracted partial beams with a +1st and −1st order of diffraction respectively. The two partial beams then strike the scale 610, embodied as a radial graduation, on the graduated disk 611. There, the partial beams are diffracted again in the +1st and −1st order of diffraction respectively and back-reflected in the measurement direction x essentially opposite the direction of incidence, as can be seen in FIG. 20a. The back-reflected partial beams then strike the beam direction inverter, embodied as a triple prism, from which they are again retroreflected in the direction of the scale 610. After the new diffraction of the partial beams at the scale 610, they reach a second scanning grating 624b, which superimposes the two partial beams and causes them to interfere with one another. As in the third exemplary embodiment above, the second scanning grating is embodied such that in the resultant 0th and +1st and −1st orders of diffraction, preferably three beams phase-offset from one another by 120° exit and are detected via the detector elements 629.1-629.3 of the detector unit.

The first scanning grating 624a once again combines various optical functionalities. For instance, it acts as a splitting grating, which splits the beam, arriving from the light source 621, into two partial beams. Simultaneously, a symmetrical deflection functionality for the two partial beams is associated with this splitting. The first splitting grating 624a moreover acts as a first wave front corrector. As a result, the exiting wave fronts of the two partial beams are distorted in such a way that after the deflection at the scale 610, embodied as a radial graduation, respective collimated partial beams are present, which reach the beam direction inverter embodied as a triple prism. Once again, it is thus ensured that the retroreflection takes place with planar wave fronts of the partial beams involved.

Similarly to this, the second scanning grating 624b also combines various optical functionalities. For instance, the second scanning grating 624b acts as a second wave front corrector, which converts the wave fronts of the partial beams, which because of the second diffraction at the scale are distorted, back into planar wave fronts. Moreover, the second scanning grating 624b in this exemplary embodiment also acts as a combining grating, which causes the two partial beams to interfere with one another and converts them into three exiting phase-offset beams.

In contrast to the exemplary embodiments described thus far of the optical position measuring instruments of the invention, the two split partial beams here are not assigned any separate scanning gratings. It is therefore necessary that the first and second scanning gratings 624a, 624b in this exemplary embodiment each correct both partial beams with regard to their respective wave fronts. To that end, the first and second scanning gratings 624a, 624b are embodied as diffractive structures.

In closing, as a particular advantage of the sixth embodiment of the optical position measuring instrument of the invention, it can be mentioned that it has an especially compact form.

In addition to the various exemplary embodiments described thus far in detail of the optical position measuring instrument of the invention, it is understood that still other possible embodiments result within the scope of the present invention. Diverse variants will be addressed briefly below.

For instance, if the azimuthal location of the first scanning point of a scanned radial graduation deviates significantly from the azimuthal location of the second scanning point of the radial graduation, then the wave front gradients of the two scanning points are no longer rectified upon a displacement of the graduated disk out of the rated location. Instead, they are rotated relative to one another and are changed in their size. Additional optical elements, such as prisms (such as a Dove prism) or mirror arrangements, must be introduced in order to transmit them accordingly, or in other words to ensure the optimal image rotation and image scaling.

Instead of using either purely refractive or purely diffractive wave front correctors and lenses, mixed refractive and diffractive elements can also be used. Suitably embodied mirror optical elements can be used for the purpose as well.

It is understood that the scanned scale can also be embodied alternatively, namely as a transmitted-light scale.

The scanning concept of the invention can be employed not only for scanning radial or drum graduations but also for scanning other nonhomogeneous graduation structures.

It is furthermore possible to embody the beam direction inverter not only as a triple prism, triple mirror, or a lens with a mirror. Instead, a combination of a 90° roof prism and a cylindrical lens can be used for the purpose, in which case the lens effect must be oriented parallel to the roof, and the roof must be located in the focal plane of the lens, and so forth.

The foregoing description is provided to illustrate the invention, and is not to be construed as a limitation. Numerous additions, substitutions and other changes can be made to the invention without departing from its scope as set forth in the appended claims.

We claim:

1. An optical position measuring instrument for detecting a relative position of a scanning unit and a scale, said optical position measuring instrument comprising:
   a scale; and
   a scanning unit, wherein said scanning unit and said scale are movable with respect to one another along a curved measurement direction and wherein said scanning unit comprises:
      a detector unit; and
      a reflector unit comprising;
         a first wave front corrector;
         a beam direction inverter; and
         a second wave front corrector, wherein said reflector unit is disposed and/or embodied in said scanning unit so that partial beams first pass through a first combination of said scale and said first wave front corrector, then via said beam direction inverter, said partial beams are reflected back towards said scale, and said partial beams then pass through a second combination of said scale and said second wave front corrector before said partial beams then arrive at said detector unit, wherein said reflector unit has a structure so that it is ensured that wave front deformations of said partial beams, which result via a first diffraction at said scale, are converted into wave front deformations that compensate for resultant wave front deformations of said partial beams upon a second diffraction at said scale.

2. The optical position measuring instrument as defined by claim 1, wherein:
   via said first wave front corrector, a conversion of wave fronts exiting from said first combination of said scale and said first wave front corrector so that a first collimated partial beam with planar wave fronts is formed; and
   via said second wave front corrector, a conversion of wave fronts exiting from said second combination of said scale and said second wave front corrector so that a second collimated partial beam with planar wave fronts is formed so that wave fronts of said second collimated partial beam that come to be superimposed are, after said second diffraction at said scale, identical at a superposition location.

3. The optical position measuring instrument as defined by claim 2, wherein said first combination of said scale and said first wave front corrector is arranged along a direction of beam propagation in the following order: said scale followed by said first wave front corrector and wherein said second combination of said scale and said second wave front corrector is arranged along said direction of beam propagation in the following order: said second wave front corrector followed by said scale.

4. The optical position measuring instrument as defined by claim 2, wherein said first combination of said scale and said first wave front corrector is arranged along a direction of beam propagation in the following order: said first wave front corrector followed by said scale and wherein said second combination of said scale and said second wave front corrector is arranged along said direction of beam propagation in the following order: said scale followed by said second wave front corrector.

5. The optical position measuring instrument as defined by claim 1, wherein said first combination of said scale and said first wave front corrector is arranged along a direction of beam propagation in the following order: said scale followed by said first wave front corrector and wherein said second combination of said scale and said second wave front corrector is arranged along said direction of beam propagation in the following order: said second wave front corrector followed by said scale.

6. The optical position measuring instrument as defined by claim 1, wherein said first combination of said scale and said first wave front corrector is arranged along a direction of beam propagation in the following order: said first wave front corrector followed by said scale and wherein said second combination of said scale and said second wave front corrector is arranged along said direction of beam propagation in the following order: said scale followed by said second wave front corrector.

7. The optical position measuring instrument as defined by claim 1, wherein said beam direction inverter is embodied as a triple mirror or as a triple prism.

8. The optical position measuring instrument as defined by claim 7, wherein said first wave front corrector and said second wave front corrector are embodied as diffractive optical elements.

9. The optical position measuring instrument as defined by claim 8, wherein said first wave front corrector and said second wave front corrector are each embodied as diffractive combination elements in a form of scanning gratings, which moreover have at least one of the following additional optical functionalities on said partial beams striking them:
   an optical deflection effect;
   an optical splitting or uniting effect;
   an optical focusing effect on the reflector mirror.

10. The optical position measuring instrument as defined by claim 8, wherein said reflector mirror and said diffractive optical elements are disposed on opposite sides of a transparent scanning plate.

11. The optical position measuring instrument as defined by claim 1, wherein said beam direction inverter is embodied as a combination of a lens and a reflector mirror.

12. The optical position measuring instrument as defined by claim 11, wherein said first wave front corrector and said second wave front corrector are refractive optical elements.

13. The optical position measuring instrument as defined by claim 11, wherein said lens of said beam direction inverter is embodied as a refractive optical element.

14. The optical position measuring instrument as defined by claim 13, wherein said first wave front corrector and said second wave front corrector are refractive optical elements.

15. The optical position measuring instrument as defined by claim 11, wherein said first wave front corrector and said second wave front corrector are embodied as diffractive optical elements.

16. The optical position measuring instrument as defined by claim 15, wherein said lens of said beam direction inverter is embodied as a diffractive optical element.

17. The optical position measuring instrument as defined by claim 16, wherein said reflector mirror and said diffractive optical elements are disposed on opposite sides of a transparent scanning plate.

18. The optical position measuring instrument as defined by claim 15, wherein said first wave front corrector and said second wave front corrector are each embodied as diffractive combination elements in a form of scanning gratings, which moreover have at least one of the following additional optical functionalities on the partial beams striking them:
- an optical deflection effect;
- an optical splitting or uniting effect;
- an optical focusing effect on the reflector mirror.

19. The optical position measuring instrument as defined by claim 15, wherein said reflector mirror and said diffractive optical elements are disposed on opposite sides of a transparent scanning plate.

20. The optical position measuring instrument as defined by claim 1, wherein said scale is embodied as a radial graduation on a graduated disk and is disposed concentrically around an axis of rotation of said graduated disk.

21. The optical position measuring instrument as defined by claim 1, wherein said scale is embodied as a drum graduation on an outer circumference of a rotating graduation drum, and an axis of rotation of said drum graduation coincides with a longitudinal axis of said rotating graduation drum.

22. The optical position measuring instrument as defined by claim 21, wherein optical elements are embodied and disposed in said scanning unit such that a beam emitted by a light source strikes said drum graduation at an angle not equal to 90°.

* * * * *